US012380709B2

(12) United States Patent
Levin

(10) Patent No.: US 12,380,709 B2
(45) Date of Patent: Aug. 5, 2025

(54) SELECTING DATA FOR DEEP LEARNING

(71) Applicant: Mobileye Vision Technologies Ltd., Jerusalem (IL)

(72) Inventor: Galit Levin, Tirat Carmel (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 181 days.

(21) Appl. No.: 17/508,551

(22) Filed: Oct. 22, 2021

(65) Prior Publication Data
US 2022/0129683 A1 Apr. 28, 2022

Related U.S. Application Data

(60) Provisional application No. 63/104,203, filed on Oct. 22, 2020.

(51) Int. Cl.
*G06V 20/58* (2022.01)
*G06F 18/2113* (2023.01)
*G06T 7/13* (2017.01)
*G06T 7/174* (2017.01)
*G06V 20/56* (2022.01)

(52) U.S. Cl.
CPC ........ *G06V 20/588* (2022.01); *G06F 18/2113* (2023.01); *G06T 7/13* (2017.01); *G06T 7/174* (2017.01); *G06T 2207/20084* (2013.01); *G06T 2207/30256* (2013.01)

(58) Field of Classification Search
CPC .. G06V 20/588; G06V 20/584; G06V 10/147; G06V 10/16; G06V 10/771; G06V 10/774; G06V 10/778; G06V 20/58; G06F 18/2113; G06T 7/13; G06T 7/174; G06T 2207/20084; G06T 2207/30256; G06T 2207/10024; G06T 2207/30236; G06T 2207/30241; G06T 7/181; G06T 7/246; G06T 7/277; G06T 2207/10016;
(Continued)

(56) References Cited

U.S. PATENT DOCUMENTS

2014/0307958 A1* 10/2014 Wang ................ G06F 18/214
382/159

OTHER PUBLICATIONS

Azadi, S., Feng, J., Jegelka, S. and Darrell, T., 2015. Auxiliary image regularization for deep cnns with noisy labels. arXiv preprint arXiv:1511.07069.*
(Continued)

*Primary Examiner* — Zhitong Chen
(74) *Attorney, Agent, or Firm* — Finnegan, Henderson Farabow, Garrett & Dunner

(57) ABSTRACT

Systems and methods analyze a data set including a plurality of images. In one implementation, at least one processor receives a plurality of images acquired by one or more cameras associated with at least one vehicle; and analyzes the plurality of images using an active learning system configured to determine a relative priority ranking among the plurality of images. The relative priority ranking indicates an ordered sequence for the plurality of images, and is determined based on at least one indicator, determined for each of the plurality of images, of a complexity level and a diversity level associated with representations of one or more objects represented in the plurality of images. The at least one processor then outputs information indicating the relative priority ranking among the plurality of images.

36 Claims, 31 Drawing Sheets

(58) Field of Classification Search
CPC . G06T 2207/10021; G06T 2207/20081; G06T 2207/30252
See application file for complete search history.

(56) References Cited

OTHER PUBLICATIONS

Siddiquie, B., Feris, R.S. and Davis, L.S., Jun. 2011. Image ranking and retrieval based on multi-attribute queries. In CVPR 2011 (pp. 801-808). IEEE.*
Jiang, L., Meng, D., Yu, S.I., Lan, Z., Shan, S. and Hauptmann, A., 2014. Self-paced learning with diversity. Advances in neural information processing systems, 27.*

\* cited by examiner

SELECTING DATA FOR DEEP LEARNING

CROSS REFERENCE TO RELATED APPLICATION

This application claims the benefit of priority of U.S. Provisional Application No. 63/104,203, filed on Oct. 22, 2020. The contents of the foregoing application are incorporated herein by reference in their entirety.

BACKGROUND

Technical Field

The present disclosure relates generally to vehicle navigation and, more specifically, to systems and methods for analyzing images captured by one or more cameras of a vehicle.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from on road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras.

In an embodiment, a system for analyzing a data set including a plurality of images may include at least one processor. The at least one processor may be programmed to receive a plurality of images acquired by one or more cameras associated with at least one vehicle; analyze the plurality of images using an active learning system configured to determine a relative priority ranking among the plurality of images, the relative priority ranking indicating an ordered sequence for the plurality of images, wherein the relative priority ranking among the plurality of images is determined based on at least one indicator, determined for each of the plurality of images, of a complexity level and a diversity level associated with representations of one or more objects represented in the plurality of images; and output information indicating the relative priority ranking among the plurality of images.

In an embodiment, a method for analyzing a data set including a plurality of images may include receiving a plurality of images acquired by one or more cameras associated with at least one vehicle; analyzing the plurality of images using an active learning system configured to determine a relative priority ranking among the plurality of images, the relative priority ranking indicating an ordered sequence for the plurality of images, wherein the relative priority ranking among the plurality of images is determined based on at least one indicator, determined for each of the plurality of images, of a complexity level and a diversity level associated with representations of one or more objects represented in the plurality of images; and outputting information indicating the relative priority ranking among the plurality of images.

In an embodiment, a system for analyzing a data set including a plurality of images may include at least one processor. The at least one processor may be programmed to receive a plurality of images acquired by one or more cameras associated with at least one vehicle, the plurality of images including labels associated with one or more objects represented in the plurality of images; analyze the plurality of images using an active learning system configured to select a subset of the plurality of images, the selected subset of the plurality of images being determined based on a determined loss prediction associated with the representations of the one or more objects; and output the selected subset of images for use in training the primary image analysis model.

In an embodiment, a method for analyzing a data set including a plurality of images may include receiving a plurality of images acquired by one or more cameras associated with at least one vehicle, the plurality of images including labels associated with one or more objects represented in the plurality of images; analyzing the plurality of images using an active learning system configured to select a subset of the plurality of images, the selected subset of the plurality of images being determined based on a determined loss prediction associated with the representations of the one or more objects; and outputting the selected subset of images for use in training the primary image analysis model.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
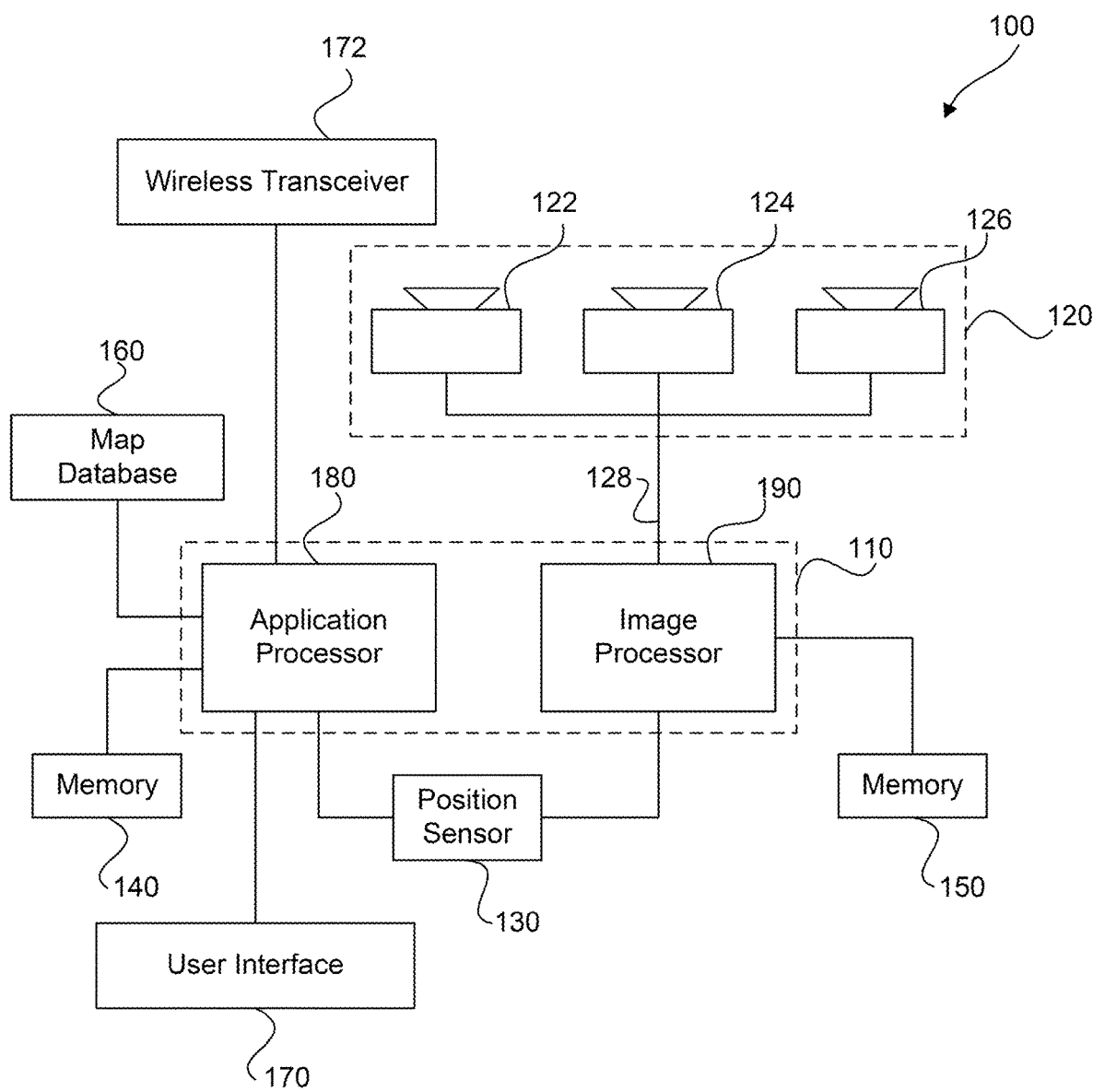
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, following by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
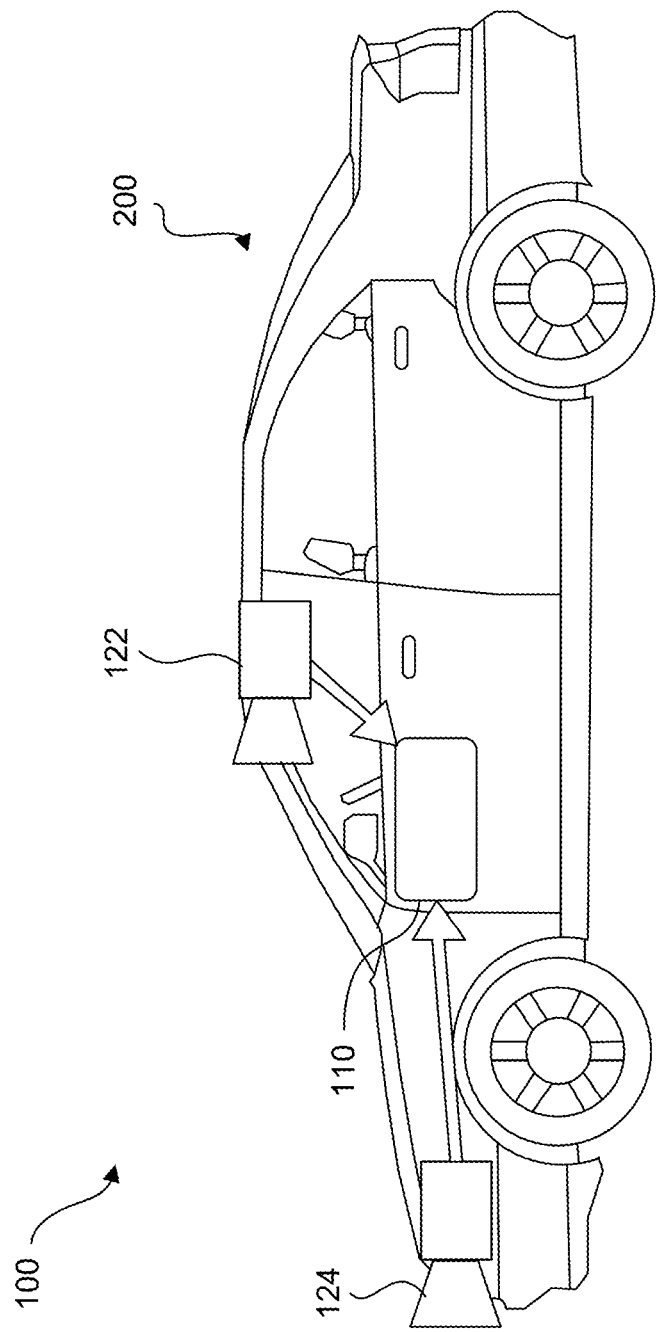
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
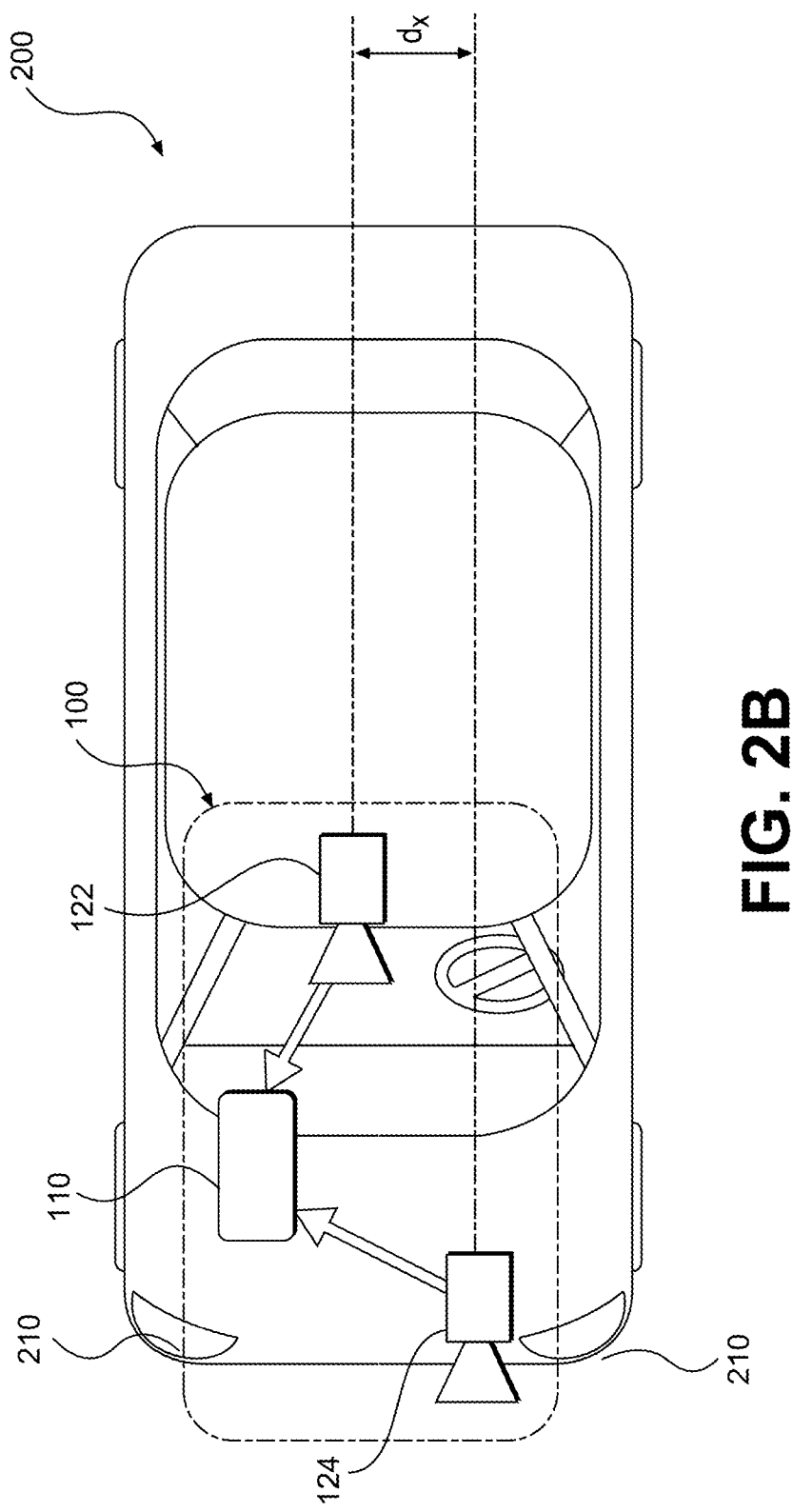
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
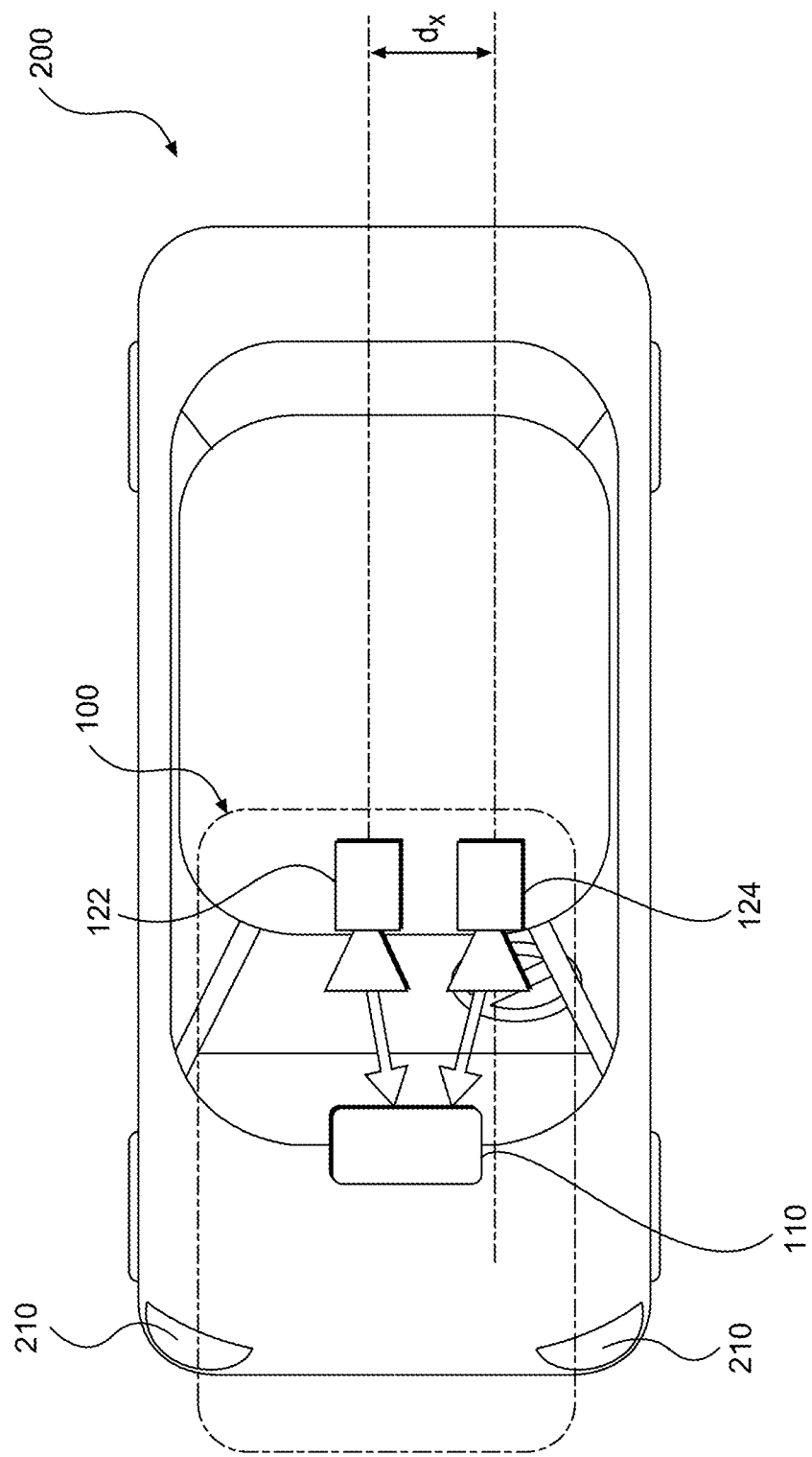
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
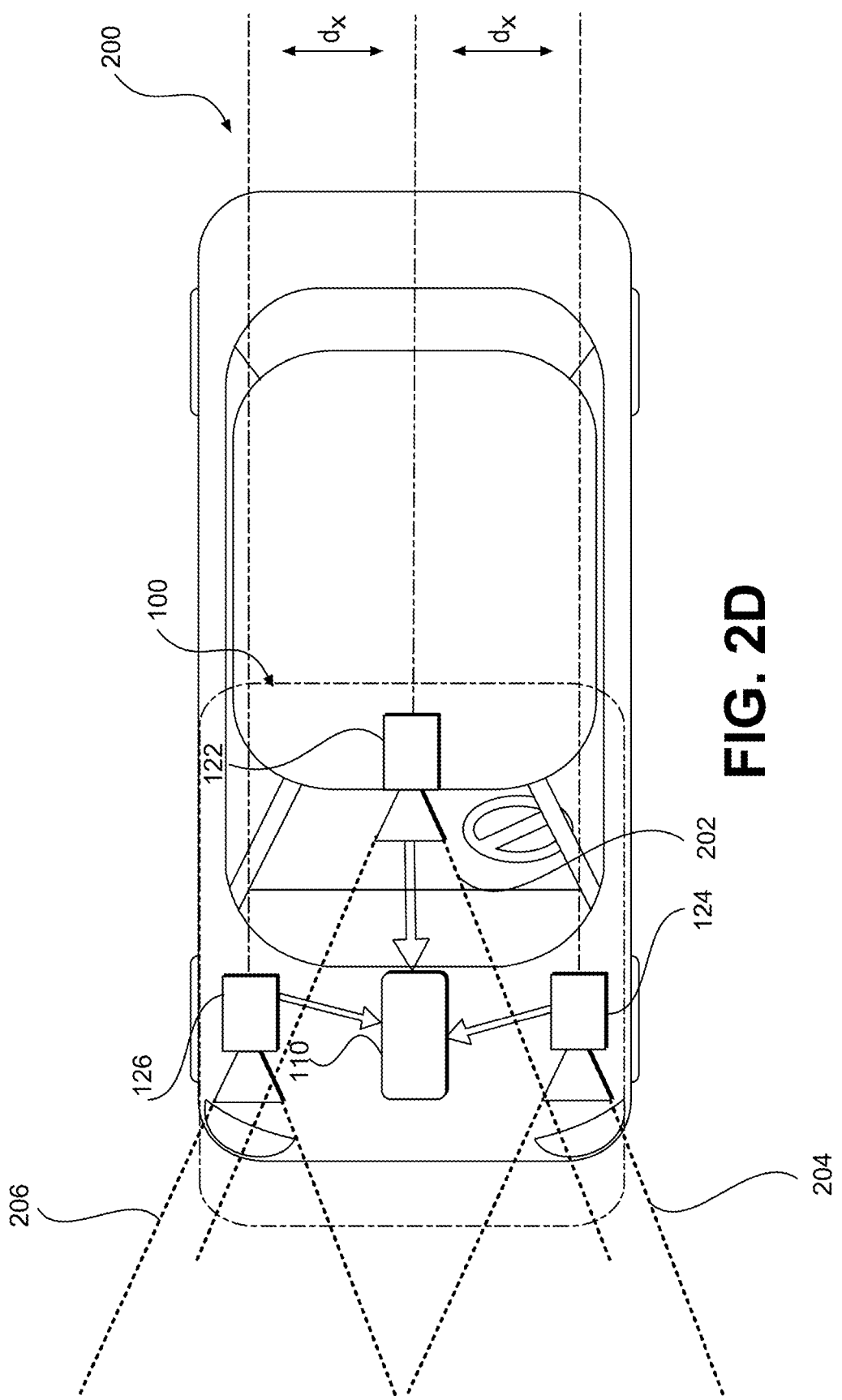
FIG. 2D is a diagrammatic top view representation of yet another embodiment of a vehicle including a system consistent with the disclosed embodiments.
Figure 2E:
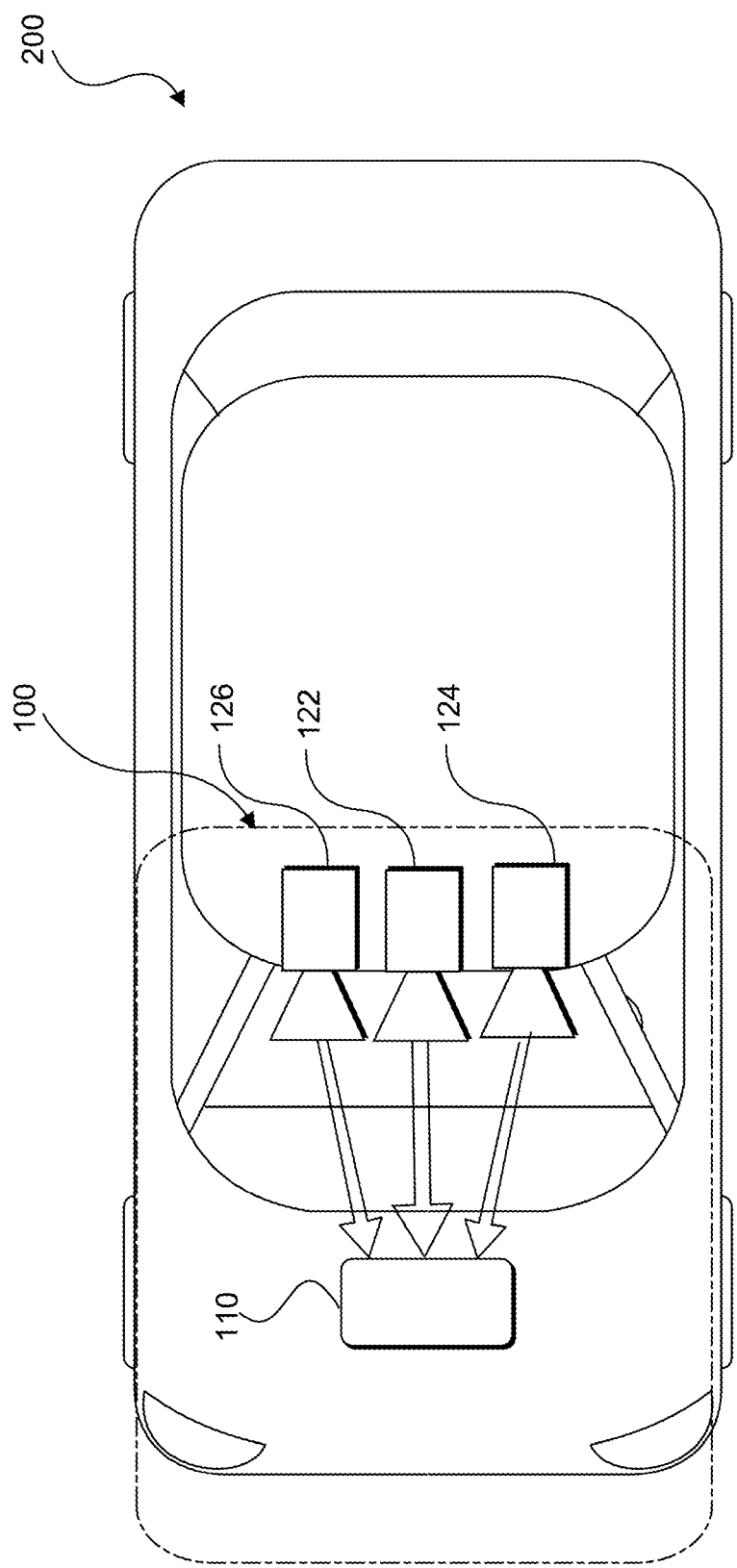
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
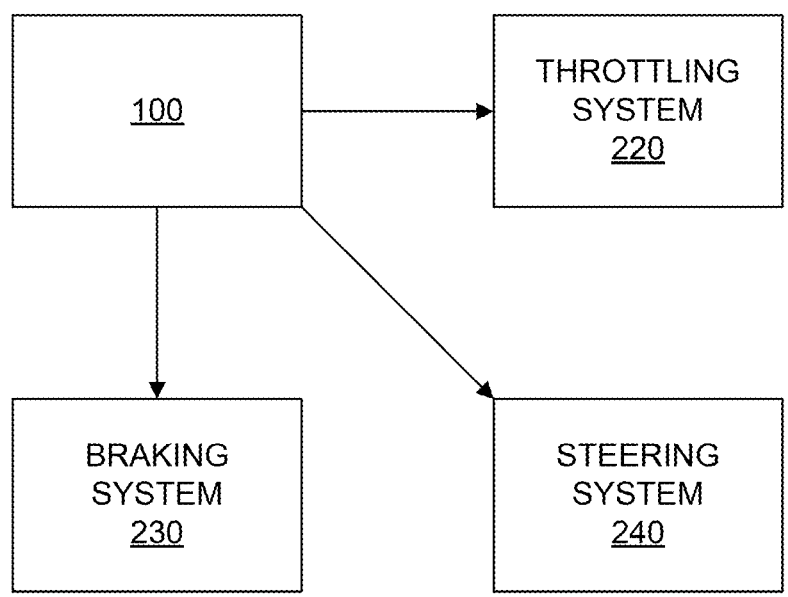
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
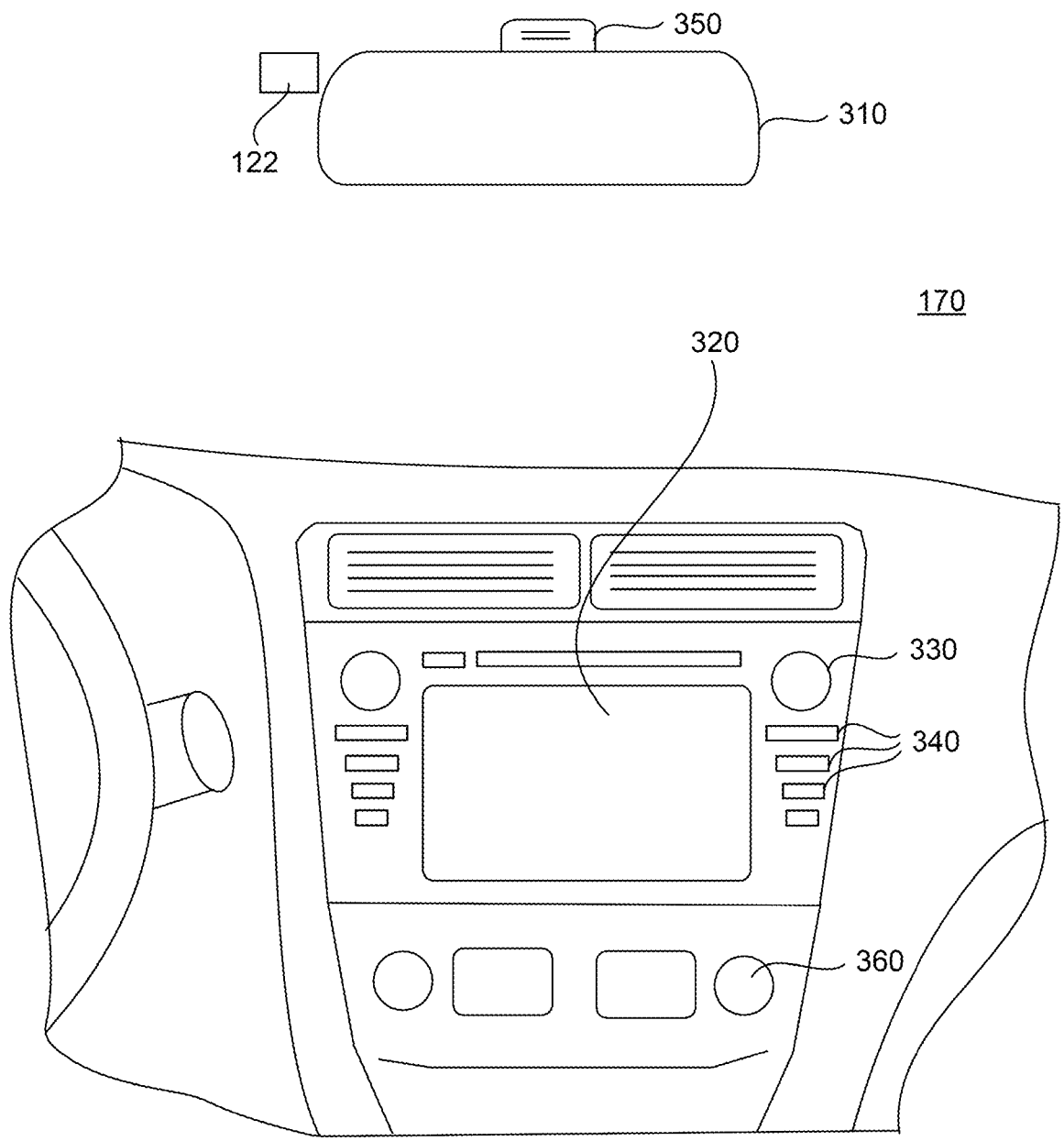
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
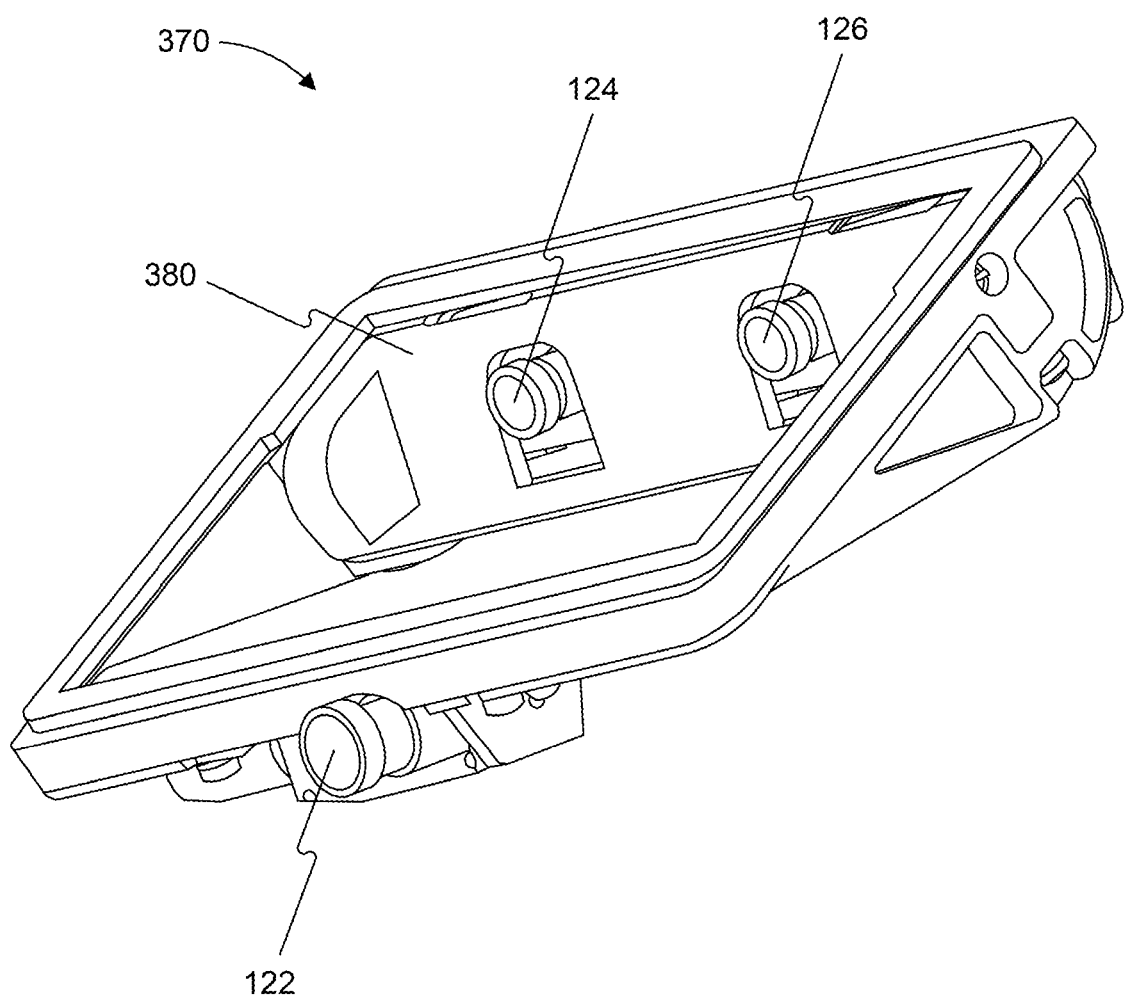
FIG. 3B is an illustration of an example of a camera mount that is configured to be positioned behind a rearview mirror and against a vehicle windshield consistent with the disclosed embodiments.
Figure 3C:
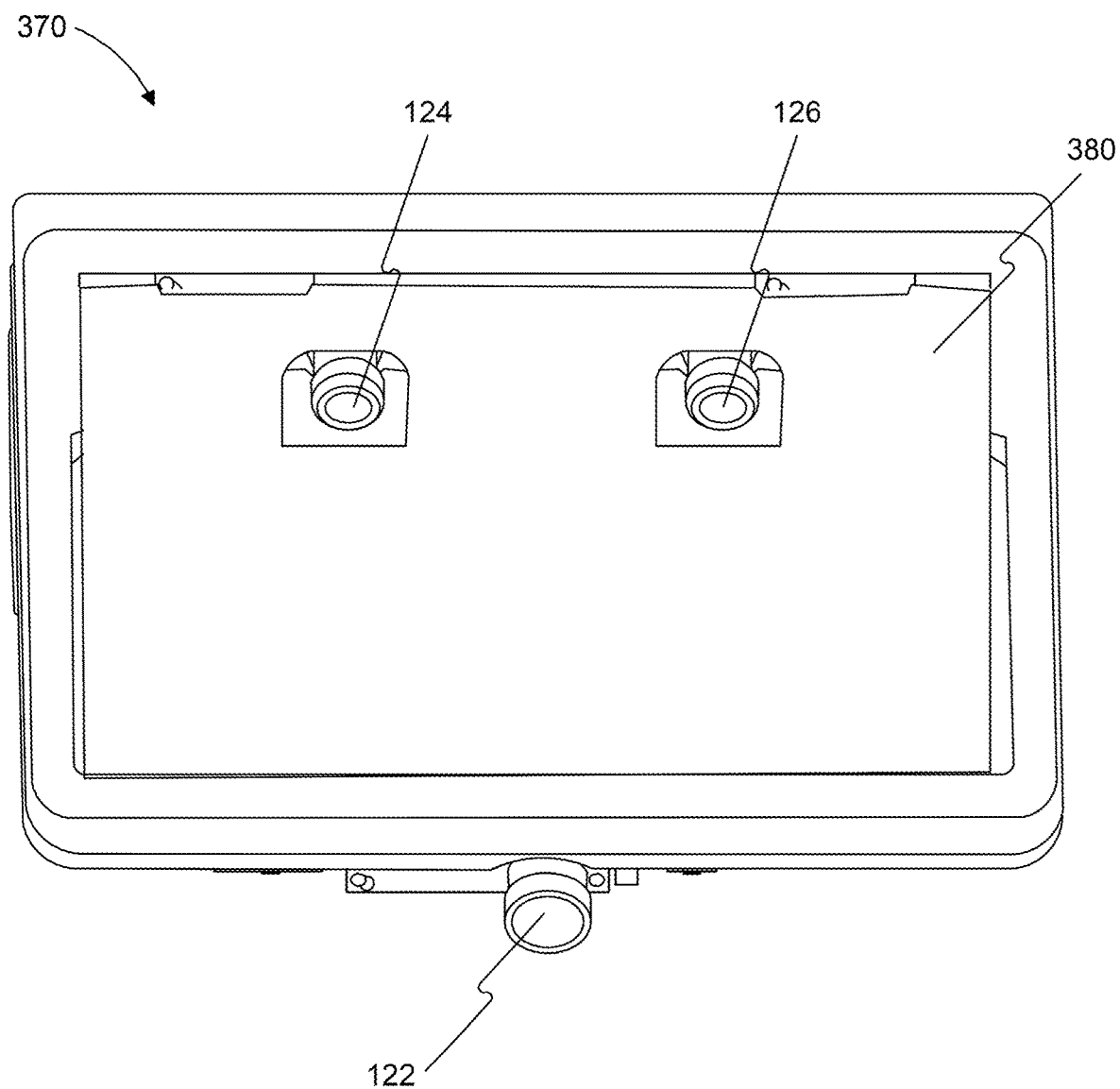
FIG. 3C is an illustration of the camera mount shown in FIG. 3B from a different perspective consistent with the disclosed embodiments.
Figure 3D:
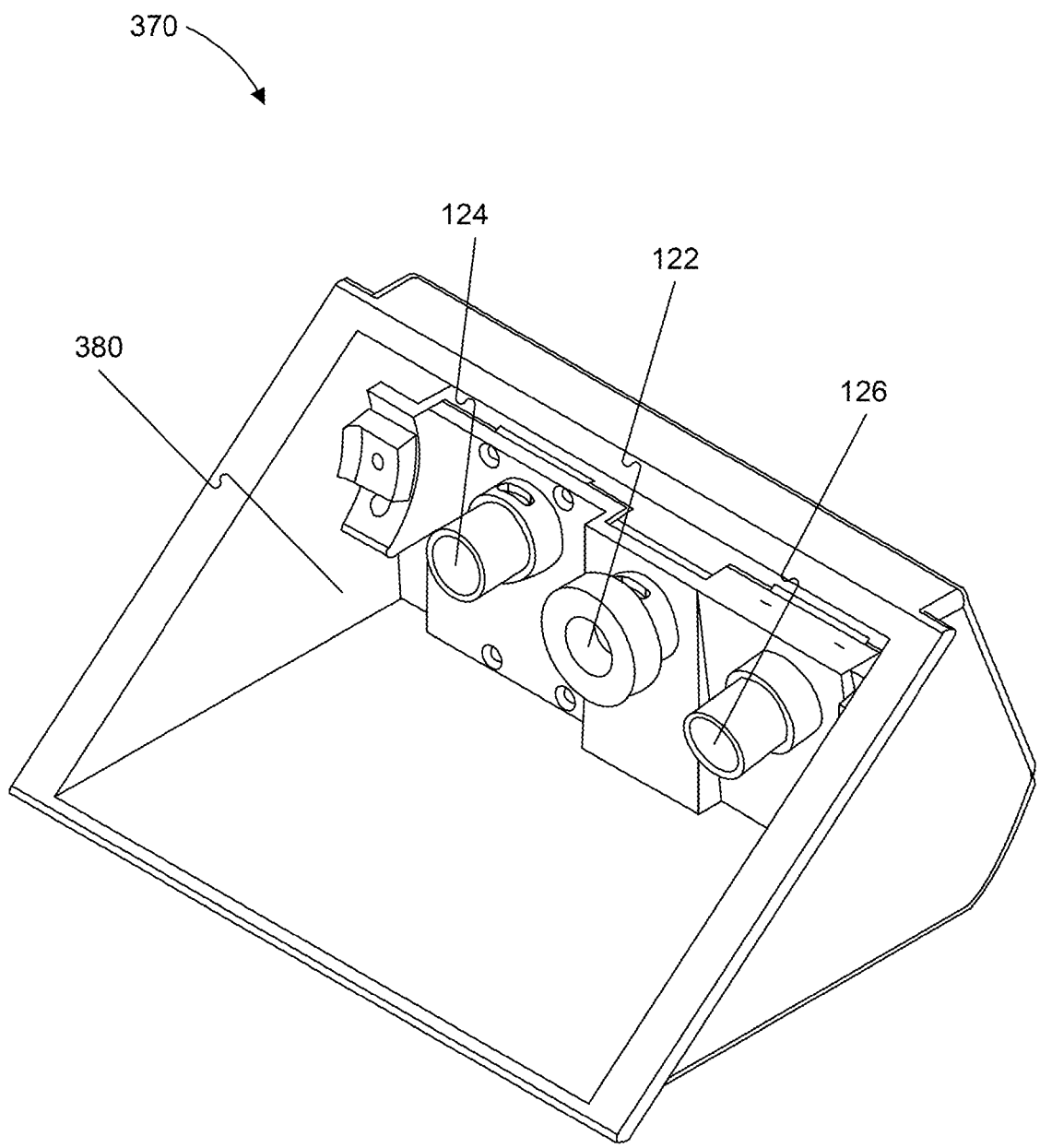
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
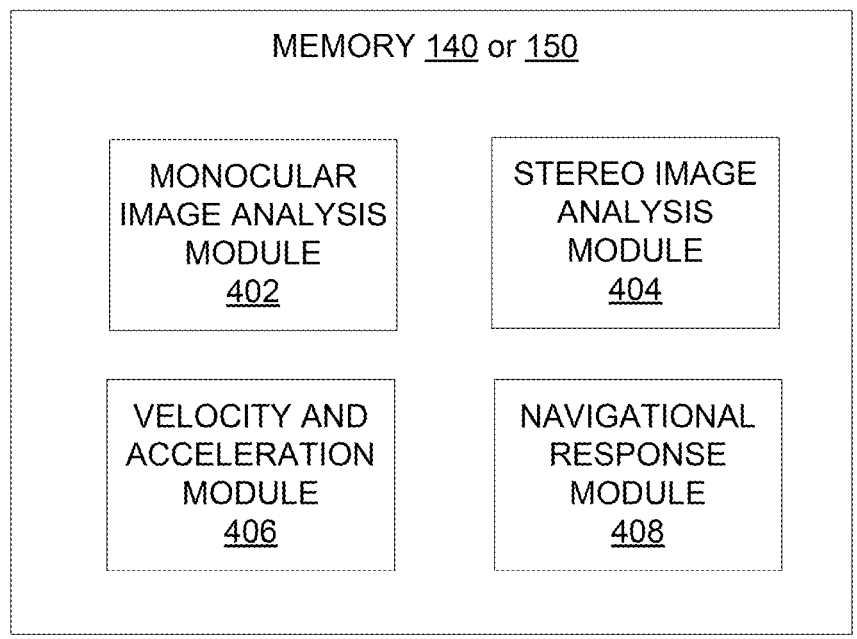
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
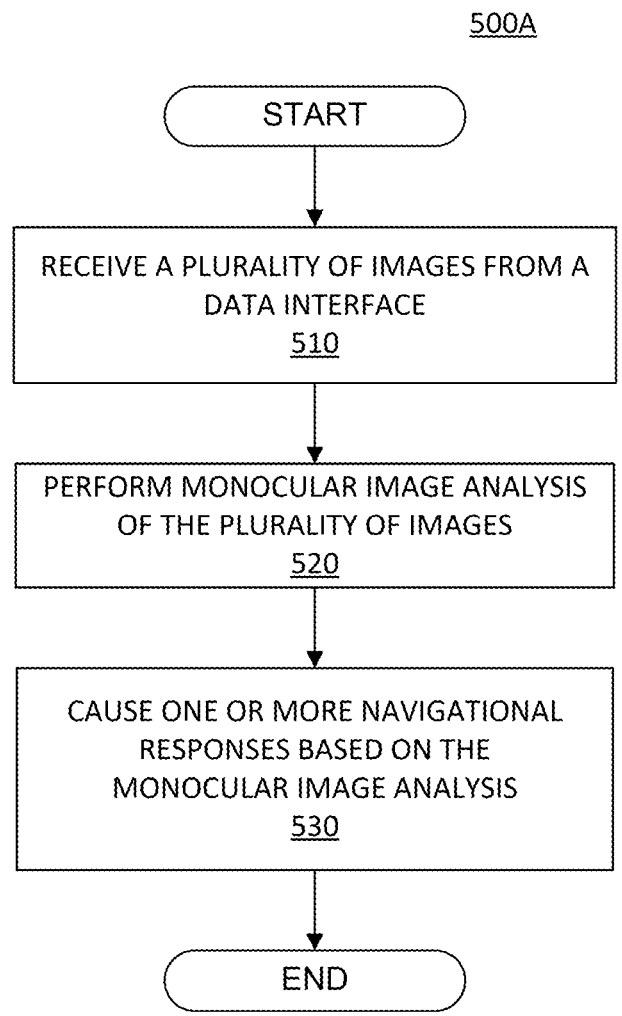
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
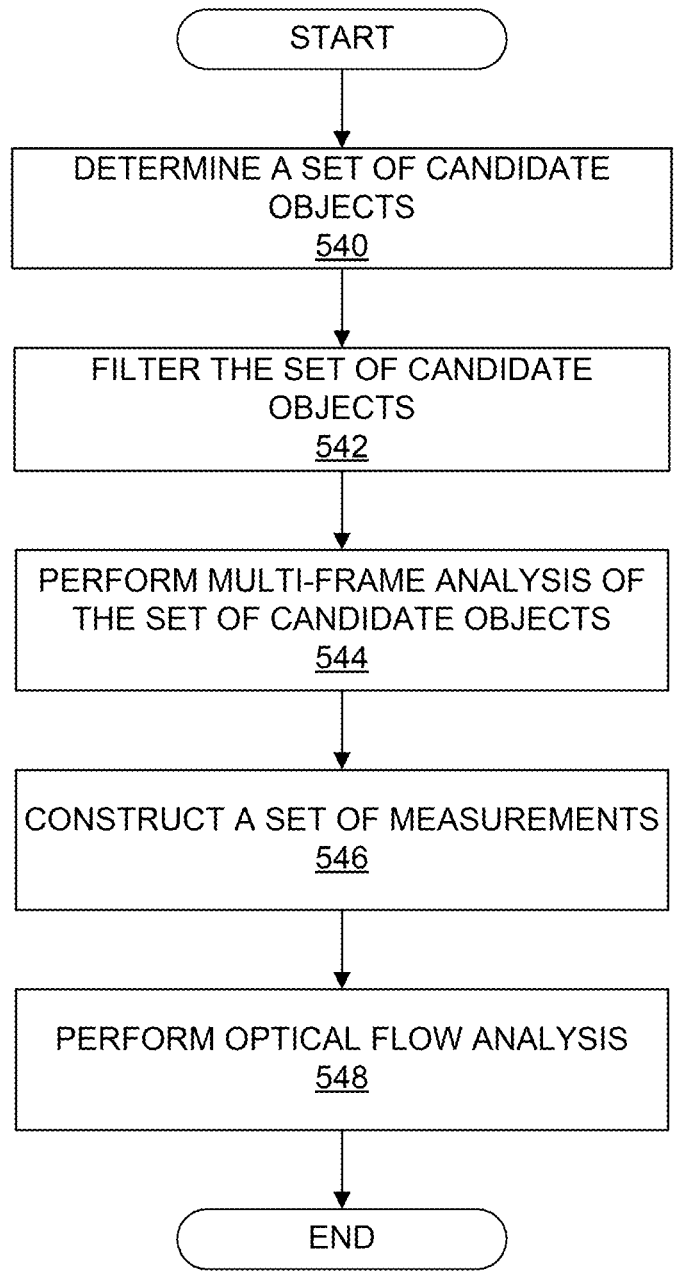
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
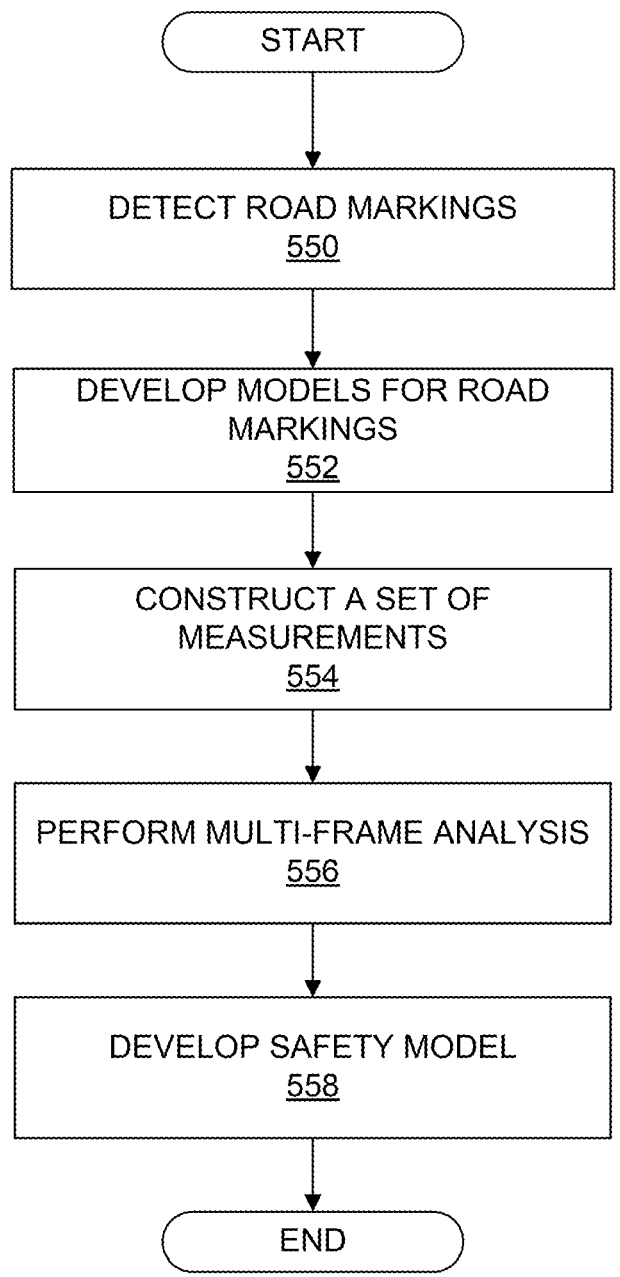
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
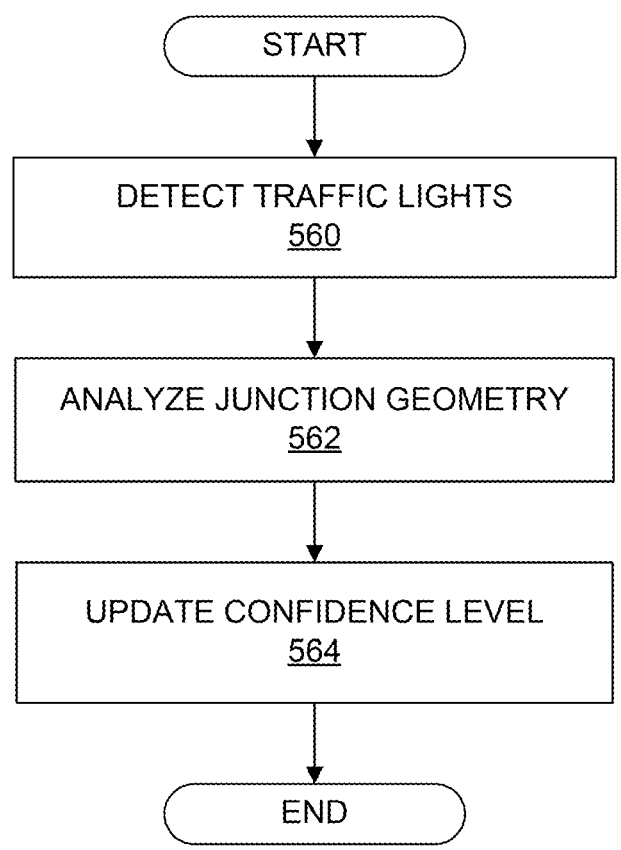
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
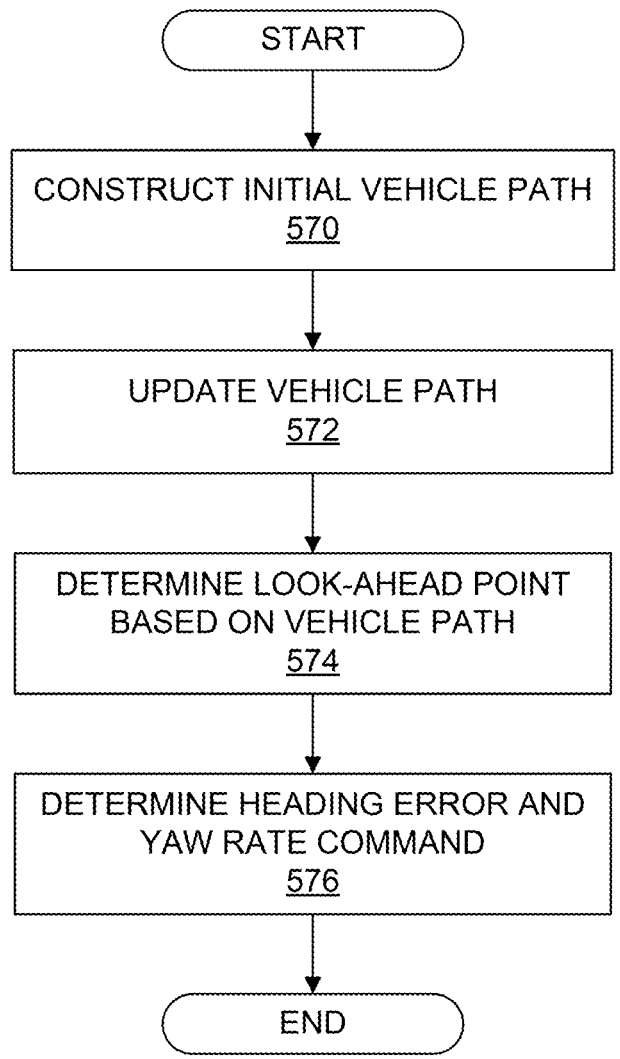
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_1$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
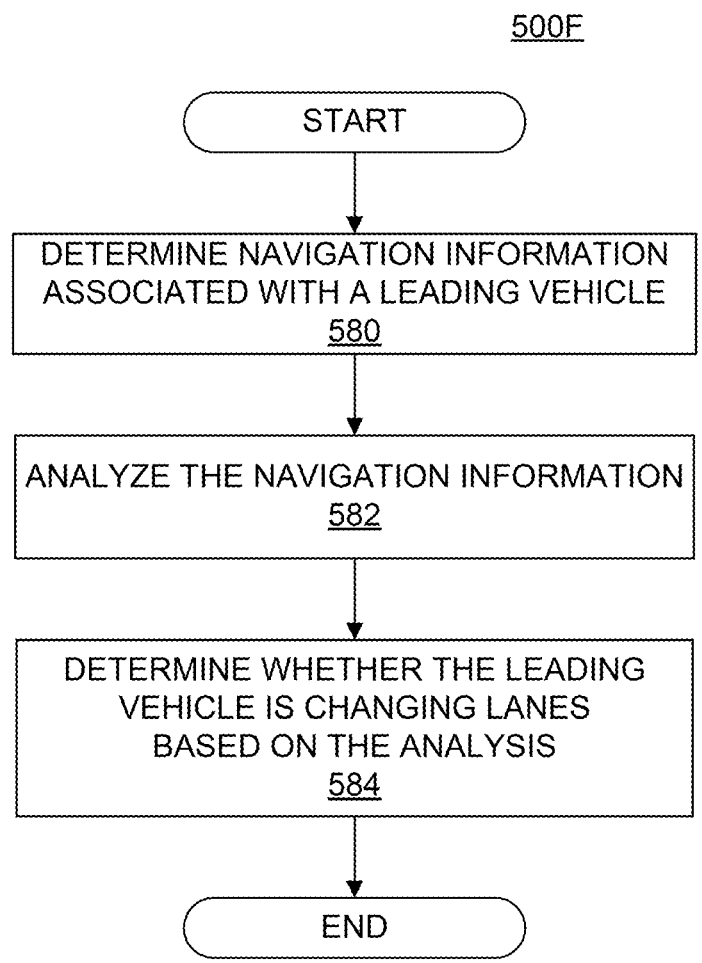
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
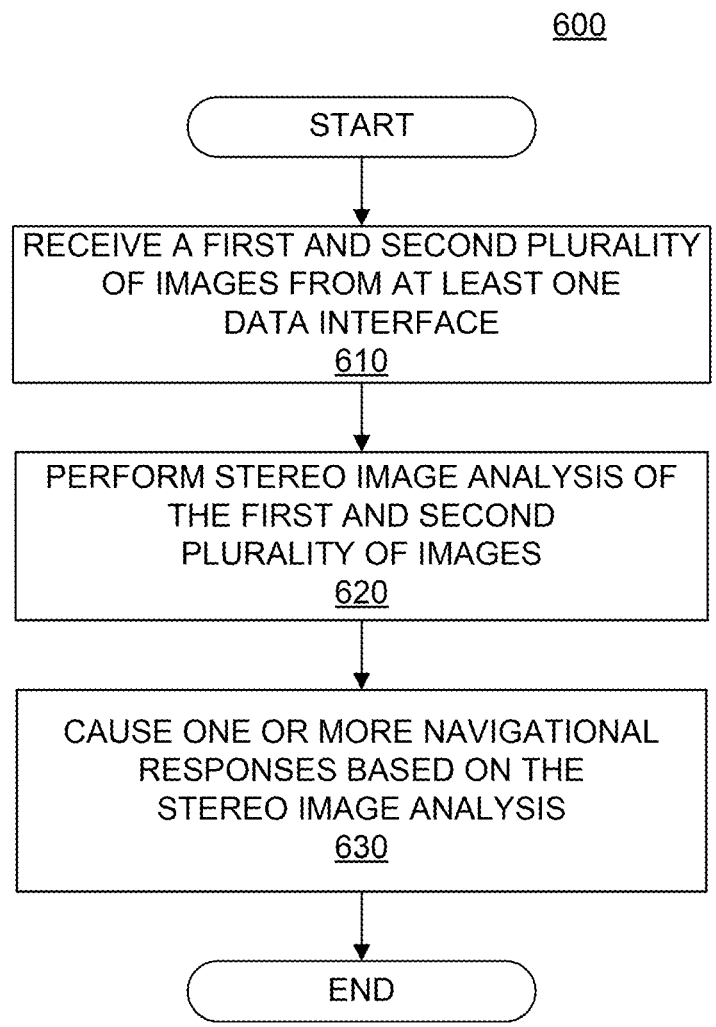
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

Figure 7:
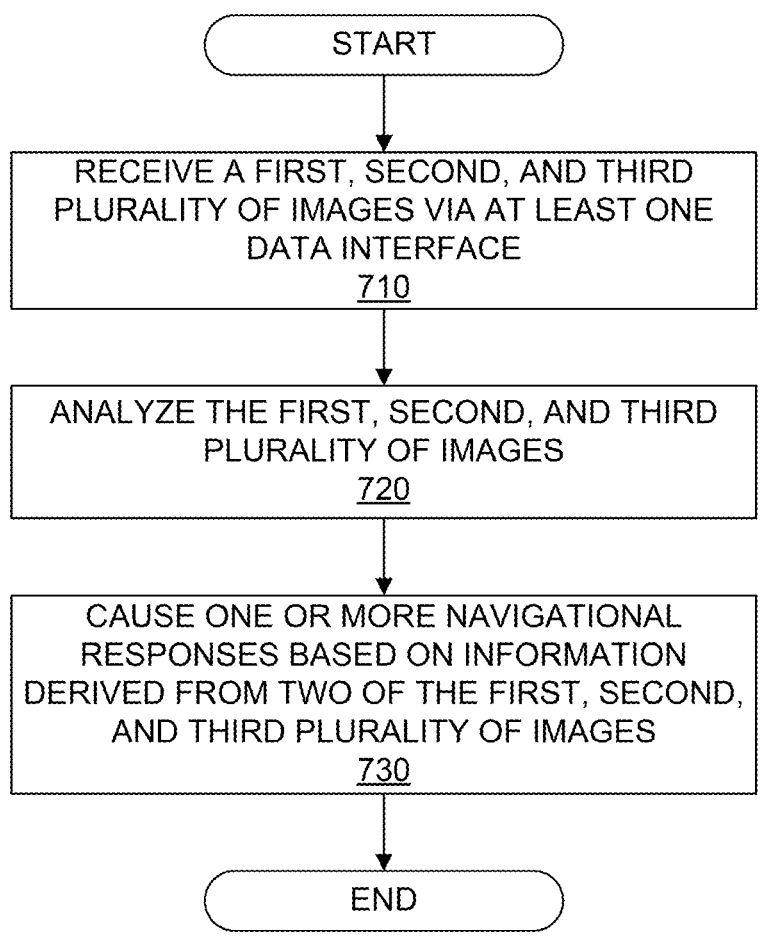
FIG. 7 is a flowchart showing an exemplary process for causing one or more navigational responses based on an analysis of three sets of images consistent with the disclosed embodiments.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof Analysis of captured images may allow for the generation and use of a sparse map model for autonomous vehicle navigation. In addition, analysis of captured images may allow for the localization of an autonomous vehicle using identified lane markings. Embodiments for detection of particular characteristics based on one or more particular analyses of captured images and for navigation of an autonomous vehicle using a sparse map model will be discussed below.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Road Feature Representation

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8A:
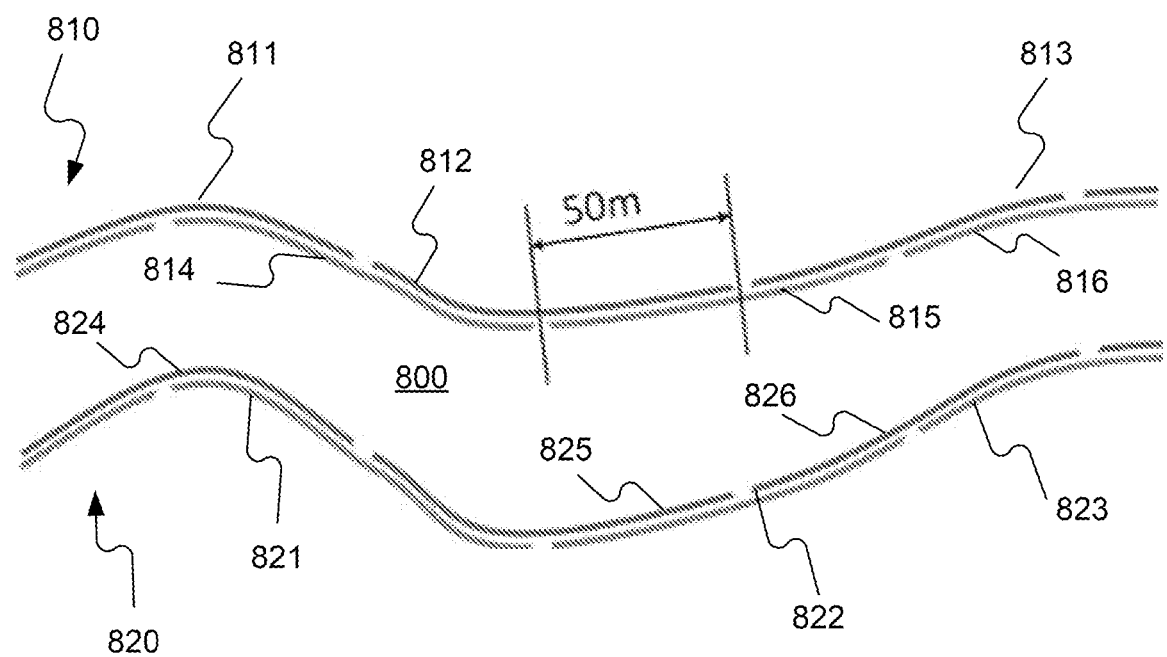
FIG. 8A illustrates a polynomial representation of a portions of a road segment consistent with the disclosed embodiments.
Figure 9A:
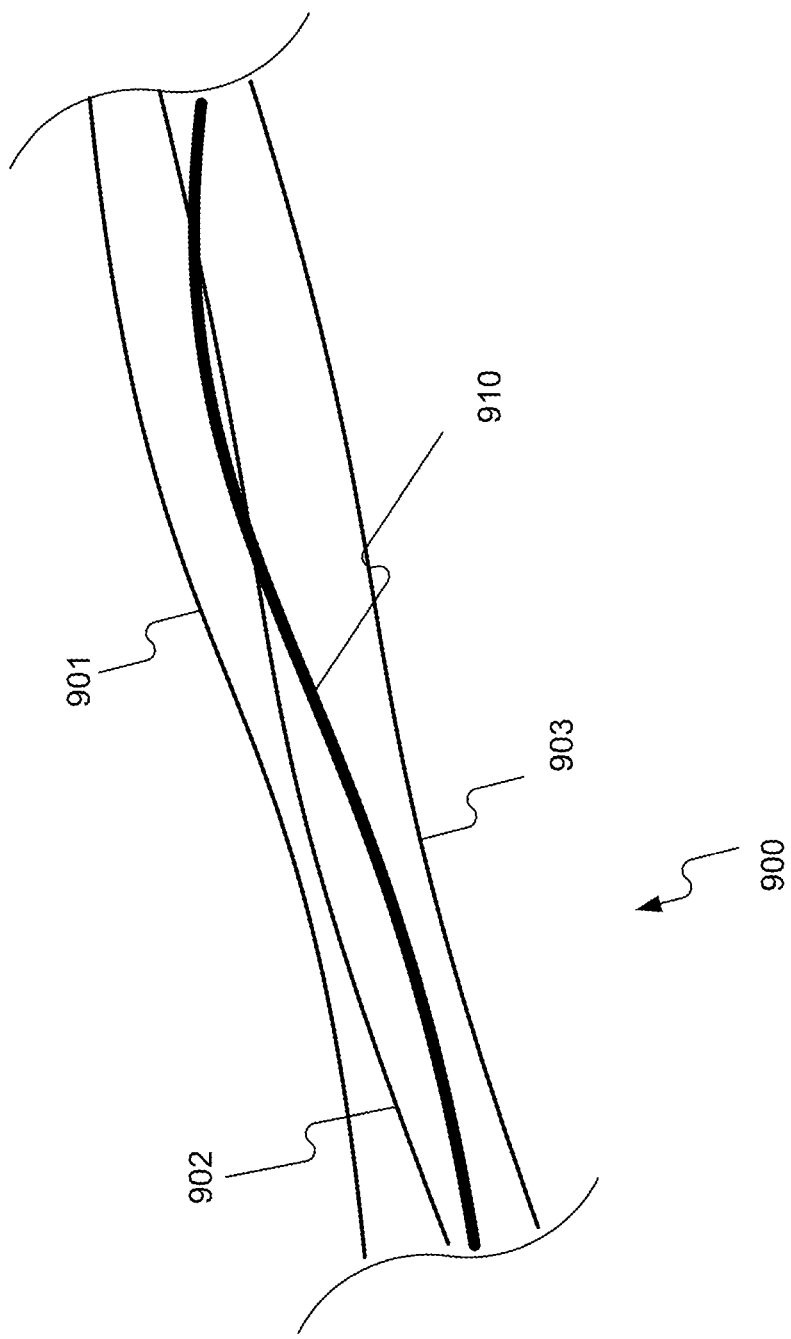
FIG. 9A shows polynomial representations of trajectories consistent with the disclosed embodiments.

In addition to target trajectories and identified landmarks, a sparse may include information relating to various other road features. For example, FIG. 9A illustrates a representation of curves along a particular road segment that may be stored in a sparse map. In some embodiments, a single lane of a road may be modeled by a three-dimensional polynomial description of left and right sides of the road. Such polynomials representing left and right sides of a single lane are shown in FIG. 8A. Regardless of how many lanes a road may have, the road may be represented using polynomials in a way similar to that illustrated in FIG. 8A. For example, left and right sides of a multi-lane road may be represented by polynomials similar to those shown in FIG. 8A, and intermediate lane markings included on a multi-lane road (e.g., dashed markings representing lane boundaries, solid yellow lines representing boundaries between lanes traveling in different directions, etc.) may also be represented using polynomials such as those shown in FIG. 8A.

As shown in FIG. 8A, a lane 800 may be represented using polynomials (e.g., a first order, second order, third order, or any suitable order polynomials). For illustration, lane 800 is shown as a two-dimensional lane and the polynomials are shown as two-dimensional polynomials. As depicted in FIG. 8A, lane 800 includes a left side 810 and a right side 820. In some embodiments, more than one polynomial may be used to represent a location of each side of the road or lane boundary. For example, each of left side 810 and right side 820 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 810 and right side 820 may be represented by a plurality of third order polynomials separated into segments of about 100 meters in length (an example of the first predetermined range), and overlapping each other by about 50 meters. The polynomials representing the left side 810 and the right side 820 may or may not have the same order. For example, in some embodiments, some polynomials may be second order polynomials, some may be third order polynomials, and some may be fourth order polynomials.

In the example shown in FIG. 8A, left side 810 of lane 800 is represented by two groups of third order polynomials. The first group includes polynomial segments 811, 812, and 813. The second group includes polynomial segments 814, 815, and 816. The two groups, while substantially parallel to each other, follow the locations of their respective sides of the road. Polynomial segments 811, 812, 813, 814, 815, and 816 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 8A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 8A, right side 820 of lane 800 is further represented by a first group having polynomial segments 821, 822, and 823 and a second group having polynomial segments 824, 825, and 826.

Figure 8B:
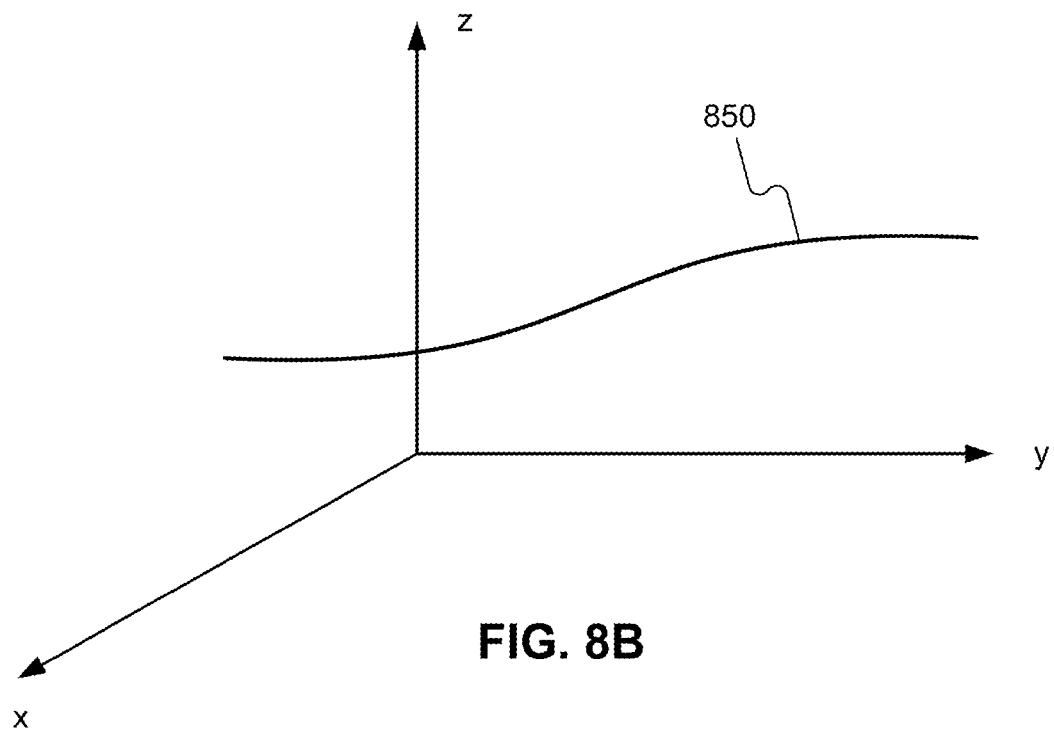
FIG. 8B illustrates a curve in three-dimensional space representing a target trajectory of a vehicle, for a particular road segment, included in a sparse map consistent with the disclosed embodiments.

Returning to the target trajectories of a sparse map, FIG. 8B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in a sparse map may be represented by one or more three-dimensional polynomials, like the three-dimensional polynomial 850 shown in FIG. 8B. A sparse map may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in a sparse map, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

A sparse map may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

FIG. 9A shows polynomial representations of trajectories captured during a process of building or maintaining a sparse map. A polynomial representation of a target trajectory included in a sparse map may be determined based on two or more reconstructed trajectories of prior traversals of vehicles along the same road segment. In some embodiments, the polynomial representation of the target trajectory included in a sparse map may be an aggregation of two or more reconstructed trajectories of prior traversals of vehicles along the same road segment. In some embodiments, the polynomial representation of the target trajectory included in a sparse map may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 9A, a road segment 900 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 9A, a first reconstructed trajectory 901 may be determined based on data received from a first vehicle traversing road segment 900 at a first time period (e.g., day 1), a second reconstructed trajectory 902 may be obtained from a second vehicle traversing road segment 900 at a second time period (e.g., day 2), and a third reconstructed trajectory 903 may be obtained from a third vehicle traversing road segment 900 at a third time period (e.g., day 3). Each trajectory 901, 902, and 903 may be represented by a polynomial, such as a three-dimensional polynomial. It should be noted that in some embodiments, any of the reconstructed trajectories may be assembled onboard the vehicles traversing road segment 900.

Additionally, or alternatively, such reconstructed trajectories may be determined on a server side based on information received from vehicles traversing road segment 900. For example, in some embodiments, vehicles 200 may transmit data to one or more servers relating to their motion along road segment 900 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 900 at a later time based on the first, second, and third trajectories 901, 902, and 903. While a target trajectory may be associated with a single prior traversal of a road segment, in some embodiments, each target trajectory included in a sparse map may be determined based on two or more reconstructed trajectories of vehicles traversing the same road segment. In FIG. 9A, the target trajectory is represented by 910. In some embodiments, the target trajectory 910 may be generated based on an average of the first, second, and third trajectories 901, 902, and 903. In some embodiments, the target trajectory 910 included in a sparse map may be an aggregation (e.g., a weighted combination) of two or more reconstructed trajectories. Aligning drive data to construct trajectories is further discussed below with respect to FIG. 29.

Figure 9B:
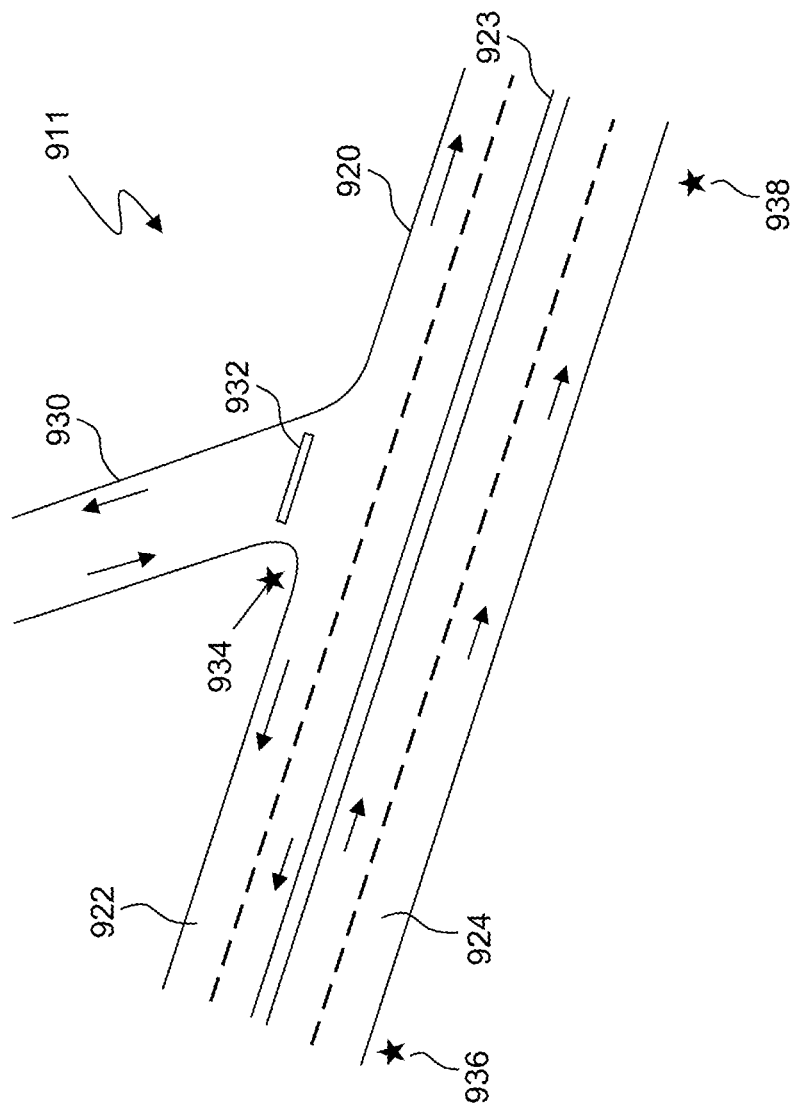
FIGS. 9B and 9C show target trajectories along a multi-lane road consistent with disclosed embodiments.
Figure 9C:
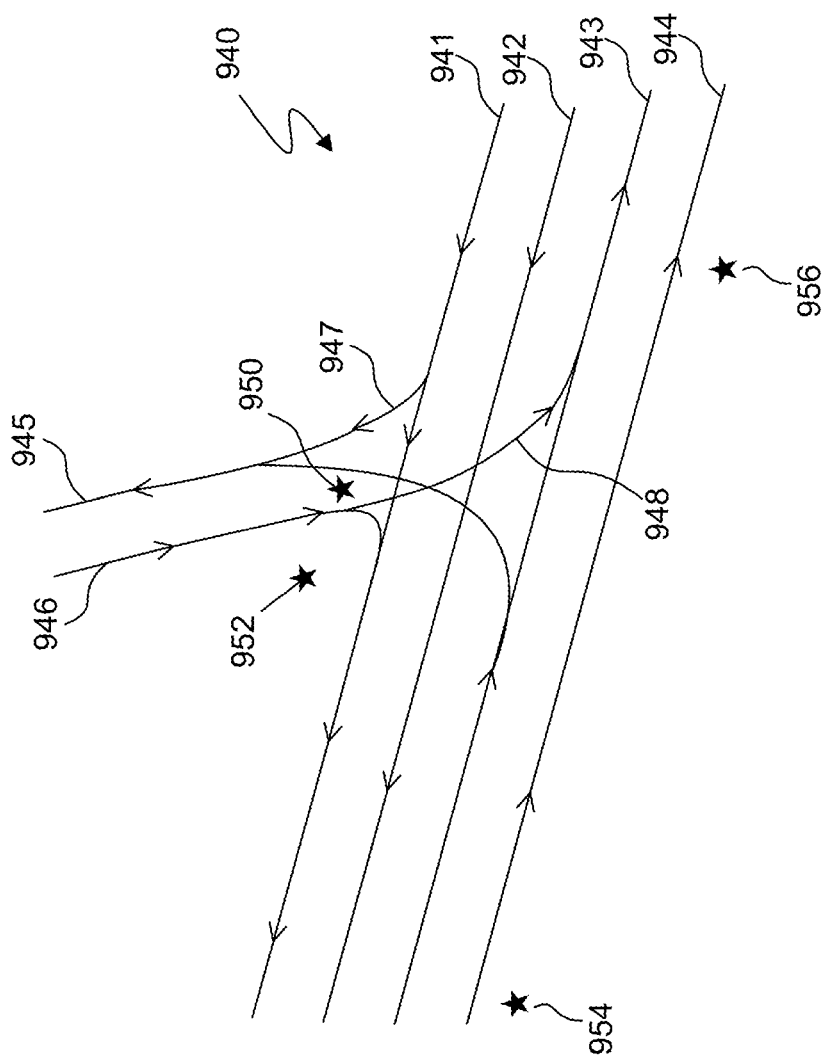

FIGS. 9B and 9C further illustrate the concept of target trajectories associated with road segments present within a geographic region 911. As shown in FIG. 9B, a first road segment 920 within geographic region 911 may include a multilane road, which includes two lanes 922 designated for vehicle travel in a first direction and two additional lanes 924 designated for vehicle travel in a second direction opposite to the first direction. Lanes 922 and lanes 924 may be separated by a double yellow line 923. Geographic region 911 may also include a branching road segment 930 that intersects with road segment 920. Road segment 930 may include a two-lane road, each lane being designated for a different direction of travel. Geographic region 911 may also include other road features, such as a stop line 932, a stop sign 934, a speed limit sign 936, and a hazard sign 938.

As shown in FIG. 9C, a sparse map may include a local map 940 including a road model for assisting with autonomous navigation of vehicles within geographic region 911. For example, local map 940 may include target trajectories for one or more lanes associated with road segments 920 and/or 930 within geographic region 911. For example, local map 940 may include target trajectories 941 and/or 942 that an autonomous vehicle may access or rely upon when traversing lanes 922. Similarly, local map 940 may include target trajectories 943 and/or 944 that an autonomous vehicle may access or rely upon when traversing lanes 924. Further, local map 940 may include target trajectories 945 and/or 946 that an autonomous vehicle may access or rely upon when traversing road segment 930. Target trajectory 947 represents a preferred path an autonomous vehicle should follow when transitioning from lanes 920 (and specifically, relative to target trajectory 941 associated with a right-most lane of lanes 920) to road segment 930 (and specifically, relative to a target trajectory 945 associated with a first side of road segment 930. Similarly, target trajectory 948 represents a preferred path an autonomous vehicle should follow when transitioning from road segment 930 (and specifically, relative to target trajectory 946) to a portion of road segment 924 (and specifically, as shown, relative to a target trajectory 943 associated with a left lane of lanes 924.

A sparse map may also include representations of other road-related features associated with geographic region 911. For example, a sparse map may also include representations of one or more landmarks identified in geographic region 911. Such landmarks may include a first landmark 950 associated with stop line 932, a second landmark 952 associated with stop sign 934, a third landmark associated with speed limit sign 954, and a fourth landmark 956 associated with hazard sign 938. Such landmarks may be used, for example, to assist an autonomous vehicle in determining its current location relative to any of the shown target trajectories, such that the vehicle may adjust its heading to match a direction of the target trajectory at the determined location.

Figure 9D:
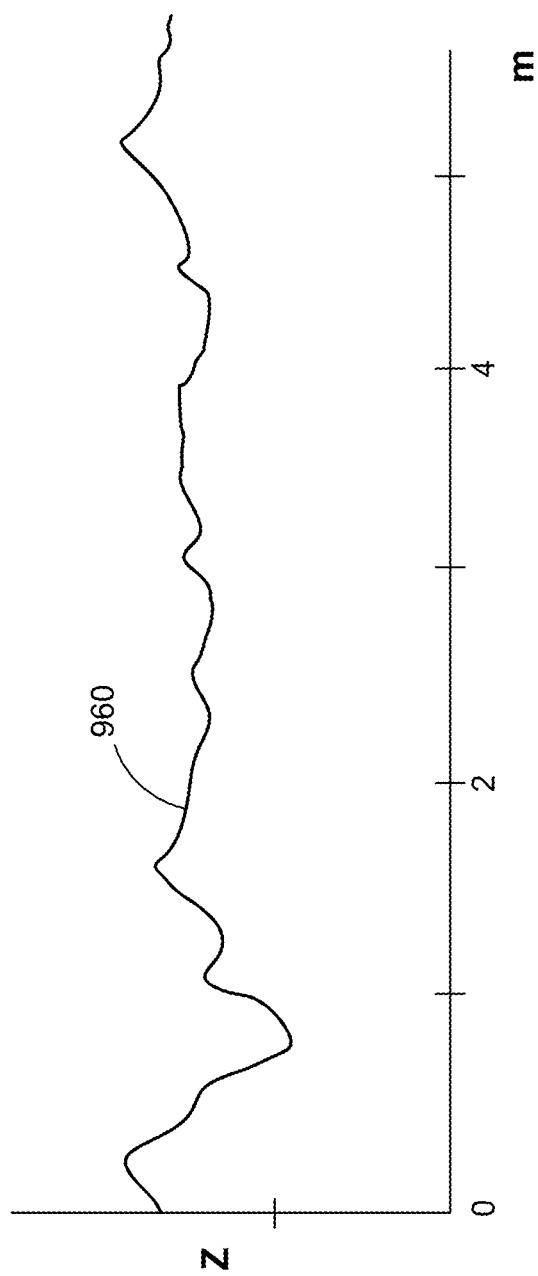
FIG. 9D shows an example road signature profile consistent with disclosed embodiments.

In some embodiments, a sparse map may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 9D shows an example of a road signature profile 960. While profile 960 may represent any of the parameters mentioned above, or others, in one example, profile 960 may represent a measure of road surface roughness, as obtained, for example, by monitoring one or more sensors providing outputs indicative of an amount of suspension displacement as a vehicle travels a particular road segment.

Alternatively or concurrently, profile 960 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, a sparse map may include different trajectories based on different characteristics associated with a user of autonomous vehicles, environmental conditions, and/or other parameters relating to driving. For example, in some embodiments, different trajectories may be generated based on different user preferences and/or profiles. A sparse map including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in a sparse map based on different environmental conditions, such as day and night, snow, rain, fog, etc. Autonomous vehicles driving under different environmental conditions may be provided with a sparse map generated based on such different environmental conditions. In some embodiments, cameras provided on autonomous vehicles may detect the environmental conditions, and may provide such information back to a server that generates and provides sparse maps. For example, the server may generate or update an already generated a sparse map to include trajectories that may be more suitable or safer for autonomous driving under the detected environmental conditions. The update of a sparse map based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in a sparse map such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Figure 10:
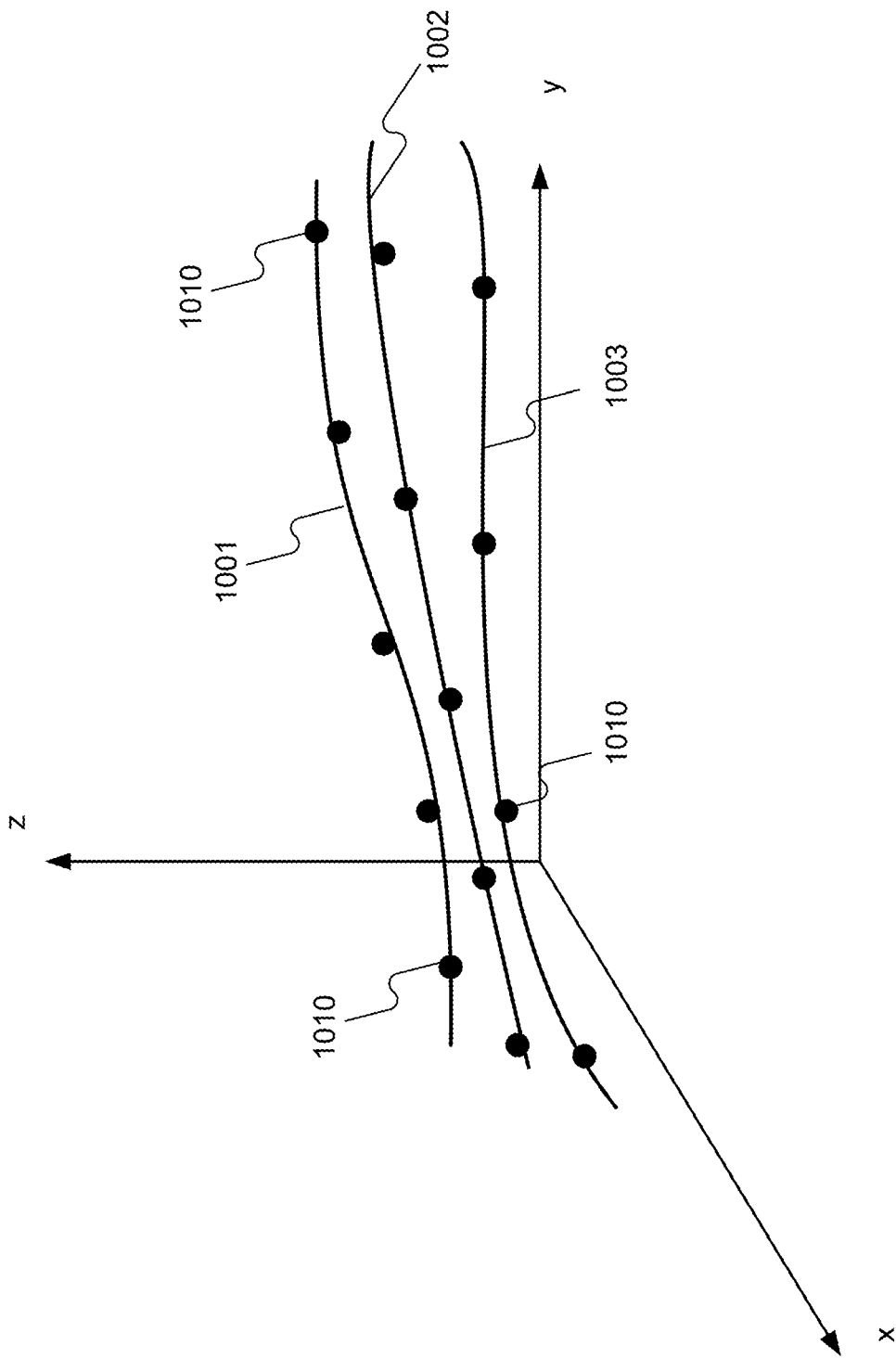
FIG. 10 illustrates an example autonomous vehicle road navigation model represented by a plurality of three dimensional splines, consistent with the disclosed embodiments.

FIG. 10 illustrates an example autonomous vehicle road navigation model represented by a plurality of three dimensional splines 1001, 1002, and 1003. The curves 1001, 1002, and 1003 shown in FIG. 10 are for illustration purpose only. Each spline may include one or more three dimensional polynomials connecting a plurality of data points 1010. Each polynomial may be a first order polynomial, a second order polynomial, a third order polynomial, or a combination of any suitable polynomials having different orders. Each data point 1010 may be associated with the navigation information received from a plurality of vehicles. In some embodiments, each data point 1010 may be associated with data related to landmarks (e.g., size, location, and identification information of landmarks) and/or road signature profiles (e.g., road geometry, road roughness profile, road curvature profile, road width profile). In some embodiments, some data points 1010 may be associated with data related to landmarks, and others may be associated with data related to road signature profiles.

Figure 11:
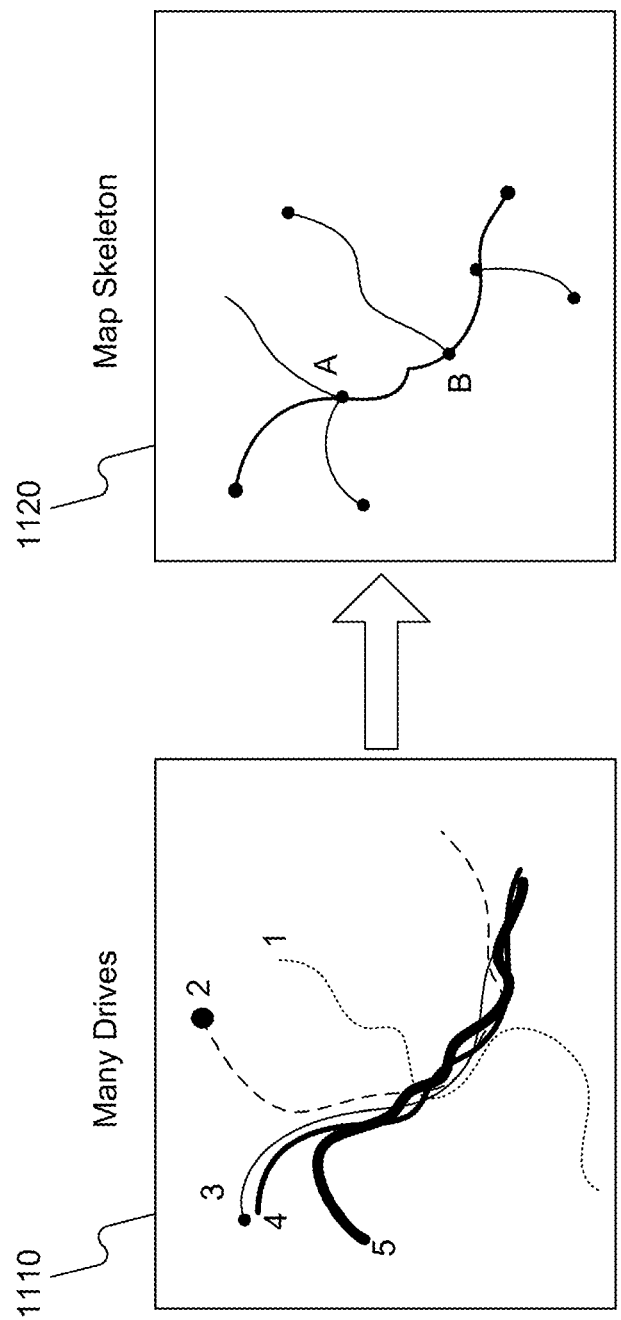
FIG. 11 shows a map skeleton generated from combining location information from many drives, consistent with the disclosed embodiments.

FIG. 11 illustrates raw location data 1110 (e.g., GPS data) received from five separate drives. One drive may be separate from another drive if it was traversed by separate vehicles at the same time, by the same vehicle at separate times, or by separate vehicles at separate times. To account for errors in the location data 1110 and for differing locations of vehicles within the same lane (e.g., one vehicle may drive closer to the left of a lane than another), a remote server may generate a map skeleton 1120 using one or more statistical techniques to determine whether variations in the raw location data 1110 represent actual divergences or statistical errors. Each path within skeleton 1120 may be linked back to the raw data 1110 that formed the path. For example, the path between A and B within skeleton 1120 is linked to raw data 1110 from drives 2, 3, 4, and 5 but not from drive 1. Skeleton 1120 may not be detailed enough to be used to navigate a vehicle (e.g., because it combines drives from multiple lanes on the same road unlike the splines described above) but may provide useful topological information and may be used to define intersections.

Selecting Data for Deep Learning

As described above, a trained system such as a neural network or deep neural network may be used to process and analyze one or more images. For example, this may include a trained artificial intelligence model used for analyzing images captured by one or more host vehicles to detect landmarks or other objects, determine one or more characteristics of the objects, or various other image analysis functions, as described throughout the present disclosure. In some embodiments, the training of these systems may be an arduous process. For example, generating data that is useful for training a neural network may require annotation of a large collection of data, such as images captured by one or more vehicles, which may involve significant effort. This data annotation is typically done manually (or semi-manually) by human experts which can be labor intensive and may, in some cases, involve interactions with third parties which can add additional time and expense. Since autonomous vehicles typically harvest large volumes of unannotated data daily, spending time and resources to annotate large volumes of data is costly and inefficient. In addition, relying on human input to label or annotate the images often leads to mistakes or inconsistencies in how objects are labeled, which can degrade performance of a trained model that uses the labeled or annotated images. For example, when labeling a bicycle in an image, one human annotator may select a region including just the bicycle, whereas another human annotator may select a region including both the bicycle and its rider. These inconsistencies may introduce inaccuracies in the trained model. Moreover, a significant portion of a set of training image dataset may include images that are redundant or that do not provide useful or interesting information. For example, in many data sets a majority of the images may include straight or similar portions of a road without other vehicles or objects and may be of little value for training a model since each image is substantially similar. Accordingly, expending resources to annotate such images may be wasteful of resources and unnecessary time consuming.

To overcome these and other difficulties with training a model using a large set of training images, the disclosed embodiments may include refining an image data set prior to input into the model. In some embodiments, this may include streamlining an annotation process. In particular, an active learning system may be used to analyze large image data sets and sort the image data based on how informative the image data may be in training a model. For example, this may include a level of complexity or diversity of objects represented in the images, as described in greater detail below. The sorted image data may then be used to indicate which of the images in the data set may be most valuable for use as training data and thus warrant manual annotation/labeling. In some embodiments, the disclosed methods may be performed on image sets that have already been labeled. For example, this may include selecting a subset of labeled images in a dataset of previously labeled images, and training the model based on the subset of labeled images. This subset may be selected to include images most useful or beneficial for training the model, while filtering out redundant images or images that are less informative for the model. As compared to training the model using the full original set of images, the more informative subset of images may allow the model to converge significantly faster, increasing the efficiency for training the model. Further, the resulting model trained using the selected subset of images may exhibit similar or even improved performance compared to the same model trained using the full set of images, since the subset of images are selected to include the most informative and robust images.

Figure 12:
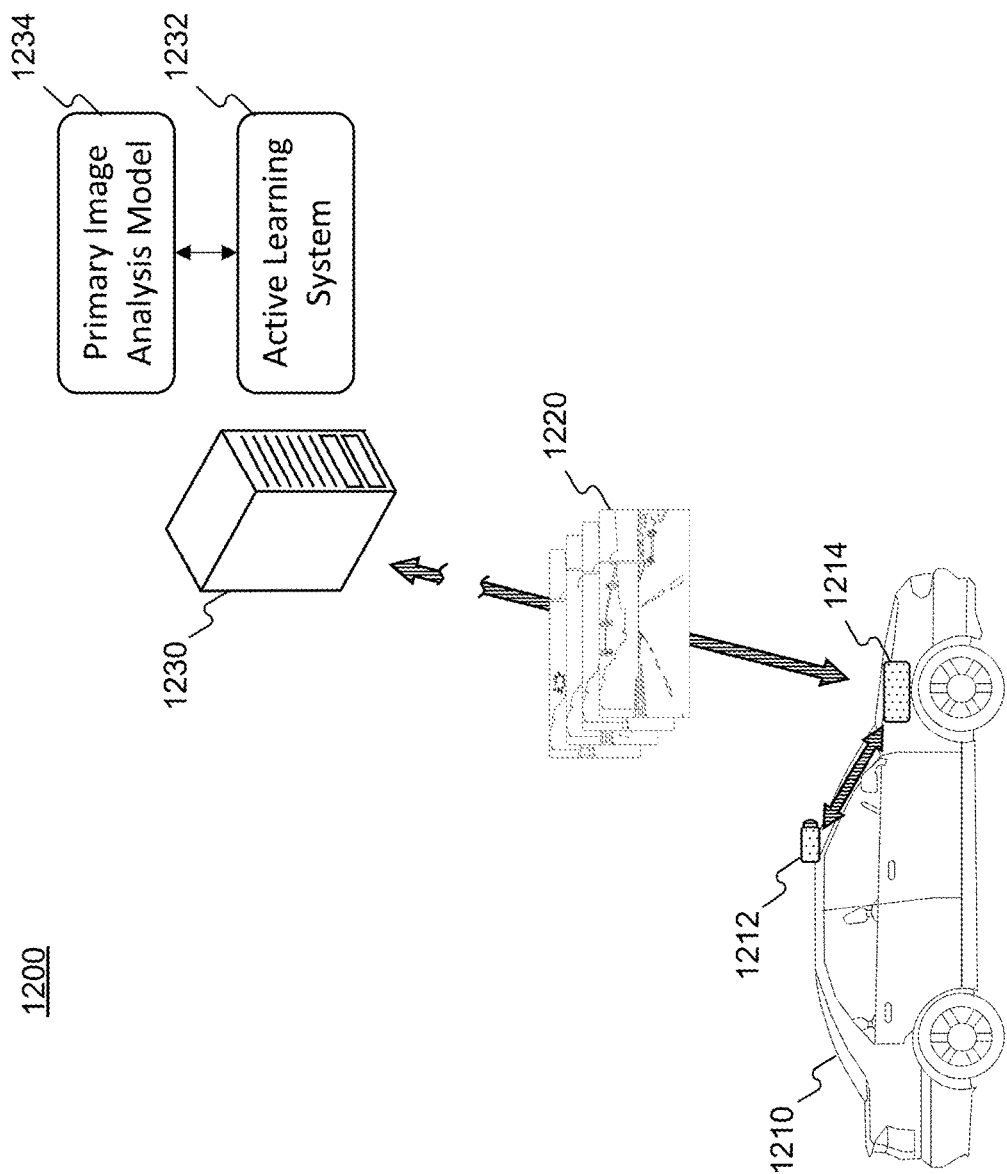
FIG. 12 illustrates an example system for analyzing a data set including a plurality of images, consistent with the disclosed embodiments.

FIG. 12 illustrates an example system 1200 for analyzing a data set including a plurality of images, consistent with the disclosed embodiments. A server 1230 may receive a plurality of images 1220, which may have been captured by one or more host vehicles. For example, a host vehicle 1210 may be configured to capture one or more images from the environment of vehicle 1210 along a road segment using one or more cameras (e.g., a camera 1212 or a plurality of cameras 1212). Host vehicle 1210 may further include one or more processing devices 1214 for processing the captured images and transmitting them to server 1230. In some embodiments, host vehicle 1210 may correspond to vehicle 200 discussed above. Accordingly, any of the features or embodiments described herein in reference to vehicle 200 may also apply to host vehicle 1210. For example, camera 1212 may correspond to one or more of image capture devices 122, 124, and 126 and processing device 1214 may correspond to processing device 110, described above. In some embodiments, the plurality of images 1220 may be captured by more than one host vehicle. This may include various other limitations on the images that are included. For example, in some embodiments, the plurality of images may be associated with a particular geographic area, such as a particular state, city, neighborhood, road segment, or other defined region. As another example, the images may be from a plurality of drives occurring during a predetermined time period, such as a particular year, a particular month, a particular day, a particular time of day, or any other specified range of times or dates.

Server 1230 may communicate with host vehicle 1210 via one or more networks (e.g., over a cellular network and/or the Internet, etc.) through a wireless communication path as indicated in FIG. 12. For example, server 1230 may collect image data from multiple vehicles travelling on one or more road segments at different times, and may store the received image data on a non-transitory computer-readable medium, such as a hard drive, a compact disc, a tape, a memory, etc. Server 1230 may then process the images (e.g., through a processor included in server 1230) to train a primary image analysis model 1234. For example, server 1230 may include an active learning system 1232 for analyzing and refining the collected image data and the refined results may be used to train primary image analysis model 1234.

In some embodiments, active learning system 1232 may be implemented as a trained machine learning system, such a neural network or other form of a trained model. In some embodiments, active learning system 1232 may be trained in conjunction with primary image analysis model 1234. For example, an initial set of images may be input into primary image analysis model 1234 to train primary image analysis model 1234 to recognize one or more objects within the initial set of images. Active learning system 1232 may assess this training process and may be trained to identify which of the images of the initial set of images provide the greatest benefit for training the model. As a result, active learning system 1232 may be trained to select a subset of images (or ranking of the images) that are predicted to be the most informative for training primary image analysis model 1234. Notably, when trained in this manner, active learning system 1232 may converge even before primary image analysis model 1234 converges, and therefore may be trained on a relatively small set of initial images. Further, active learning system 1232 may be agnostic of the particular type of algorithm or machine learning model implemented in primary image analysis model 1234 and may be trained along with any suitable type of model.

While active learning system 1232 is shown as being implemented on a remote server by way of example, it is to be understood that active learning system 1232 may be implemented on any computing device capable of accessing images 1220 and refining them for input into a machine learning model. In some embodiments, images 1220 may be collected via wired connection or other means for receiving images from host vehicle 1210, depending on the implementation of system 1200. Further, active learning system 1232 may not necessarily be implemented on the same server as primary image analysis model 1234.

Figure 13:
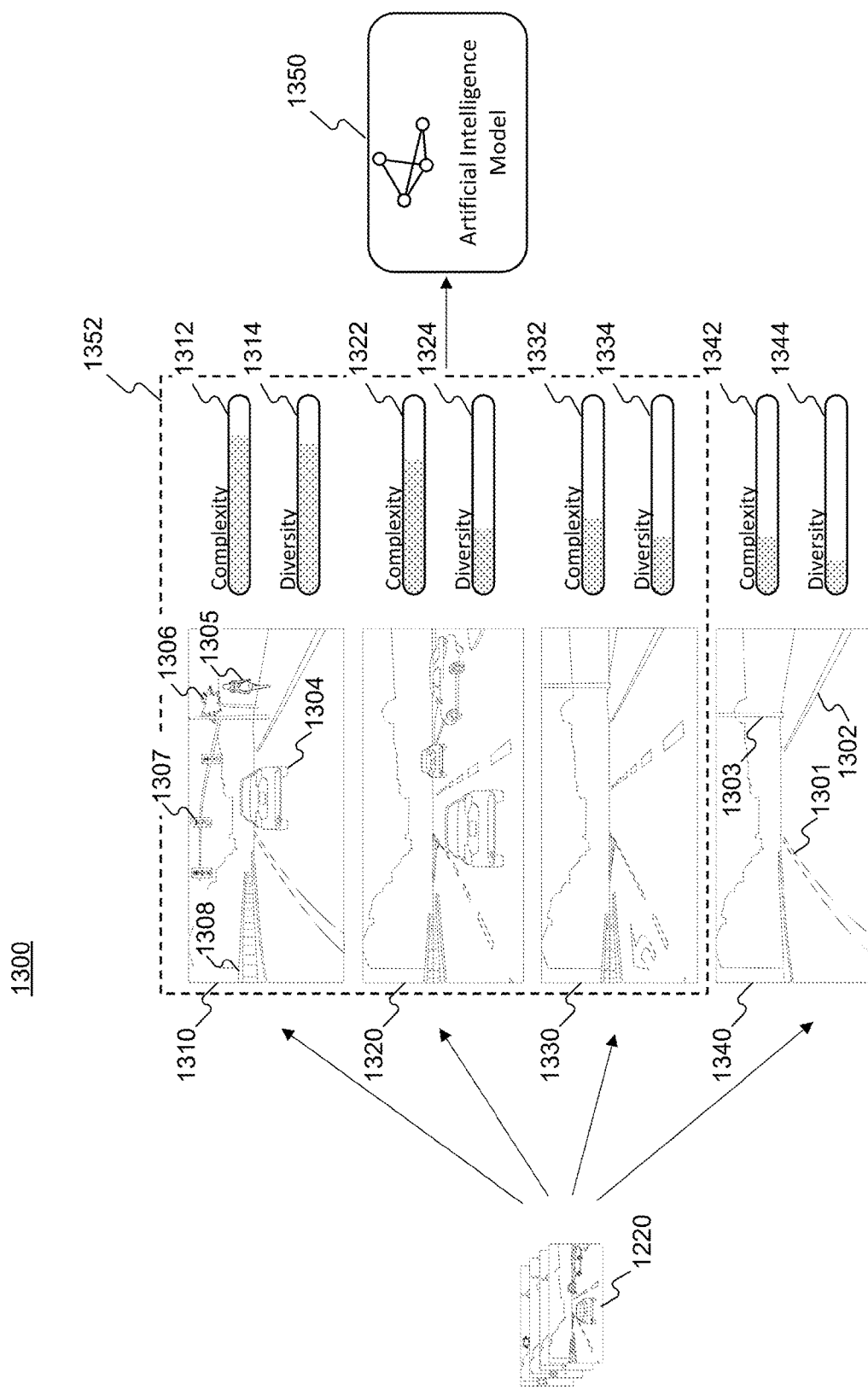
FIG. 13 is a block diagram illustrating an example refinement process for selecting a plurality of images for training a model, consistent with the disclosed embodiments.

FIG. 13 is a block diagram illustrating an example refinement process 1300 for selecting a plurality of images for training a model, consistent with the disclosed embodiments. Consistent with the disclosed embodiments, process 1300 may be performed by active learning system 1232 described above. Through process 1300, the plurality of images 1220 may be processed to identify images for input into an artificial intelligence model 1350. For example, this may include selecting one or more images 1352 from within images 1220 for use in training artificial intelligence model 1350. Artificial intelligence model 1350 may include any form of model that may be trained using labeled images. For example, artificial intelligence model 1350 may be a neural network (or deep neural network), or other form of machine learning algorithm which may be trained to perform various operations on captured images, such as detecting objects or characteristics of the detected objects, as described herein. Consistent with the disclosed embodiments, artificial intelligence model 1350 may correspond to primary image analysis model 1234 described above.

In some embodiments, process 1300 may include determining, for each image of the plurality of images 1220, at least one indicator of effectiveness for training artificial intelligence model 1350. This indicator of effectiveness may include any indication of the usefulness or saliency a particular image may have for training a model. In some embodiments, this may include one or more indicators of a complexity level or diversity level of objects represented in the images. For example, in some applications, images with many different types of objects may be of greater interest and may be more beneficial for training a model than images with fewer objects or fewer varieties of objects. In other words, it may not be worth the time required to manually label images that include only a bare stretch of road with minimal objects or other features of interest. In contrast, images with many objects of a variety of different types may have a much higher value for training a model.

In some embodiments, a complexity indicator may be determined for each of the plurality of images 1220. For example, this may include determining complexity indicators 1312, 1322, 1332, and 1342 for images 1310, 1320, 1330, and 1340, respectively. In this context, the complexity of an image may relate to the number of objects represented in the image. Accordingly, determining the complexity of an image may include applying one or more image analysis algorithms, such as an edge detection algorithm to identify objects within the image. For example, image 1340 may include a lane mark 1301, one or more road edges 1302, and a signpost 1303, as shown in FIG. 13, which may be detected as part of process 1300. Image 1310, on the other hand, may additionally include a vehicle 1304, a pedestrian 1305, a tree 1306, one or more traffic lights 1307, and a guardrail 1308, which may be detected using similar techniques. Accordingly, image 1310 may be classified as being more complex than image 1340, which may be reflected by complexity indicators 1312 and 1342. Similarly, although otherwise similar, image 1320 may have more vehicles and therefore may be more complex than image 1330, as reflected by complexity indicators 1322 and 1332.

Alternatively or additionally, a diversity indicator may be determined for each of the plurality of images 1220. For example, this may include determining diversity indicators 1314, 1324, 1334, and 1334 for images 1310, 1320, 1330, and 1340, respectively. In this context, the diversity of an image may relate to the number of different types of objects represented in an image. An object type may include any form of descriptor or classification that may characterize a detected object. For example, object types may include vehicles, lane marks, pedestrians, road signs, lamp posts, traffic lights, or various other types of objects that may be present within the environment of a host vehicle. In some embodiments, more specific object types may be used. For example, rather than or in addition to an object type "vehicle," the object types may include car, van, bus, truck, motorcycle, etc. Accordingly, the disclosed embodiments may be implemented with any suitable set of object types, depending on the application. Images including a greater number of different object types may be considered more diverse and may be of greater interest for model training (and/or data labeling) purposes. For example, as noted above, image 1310 may include a greater variety of objects of different types and thus may have a greater diversity than image 1340, as reflected by diversity indicators 1314 and 1344. However, although image 1320 includes a greater number of objects represented in image 1320 as compared to image 1330, it may have the same number of object types. In particular, the additional objects in image 1320 may all be vehicles, and therefore the number of object types represented in images 1320 and 1330 may be the same. Accordingly, diversity indicators 1324 and 1334 may be the same (or at least relatively close), as shown in FIG. 13.

The complexity indicators and diversity indicators described above may be represented in a variety of different formats. In some embodiments, these indicators may be represented on a scale, as shown in FIG. 13. As another example, the indicators may be determined in the form of a complexity or diversity score in the form of a numerical value. Alternatively or additionally, the indicators may be a relative ranking among the plurality of images 1220. For example, each of the images may be assigned a ranking indicating the complexity, diversity, or combination of both of each image relative to the other images in the set of images 1220. In some embodiments, an indicator may be determined in the form of a combined score or ranking based on diversity and complexity. In other words, rather than individual complexity and diversity indicators, an indicator for each image may be determined that accounts for both the complexity and diversity of the image. Further, although complexity and diversity are provided by way of example, any other indicators relevant to how suitable an image is for training a model may be determined. For example, various other factors such as the size, brightness, contrast, resolution, focal length, capture location, position of objects within the image frame, or any other properties of an image may similarly be assessed for each image.

As described above, process 1300 may include ranking the plurality of images 1220. In some embodiments, this may include determining a relative priority ranking among the plurality of images, which may reflect an ordered sequence for the plurality of images. For example, images 1310, 1320, 1330, and 1340 may be ranked as an ordered list or other form of ordered ranking, as shown in FIG. 13. In some embodiments, the relative priority ranking may be relative to other images in the set of images 1220. Alternatively or additionally, the relative priority ranking may be relative to a predetermined range of scores, or another predetermined frame of reference. For example, each image may be ranked according to a predetermined scale or range of scores and therefore may be ranked relative to the other images by virtue of this scale or range. In some embodiments, these indicators of relative ranking for each be provided as an output, which may be used to select images for manual labeling or otherwise using the images in association with artificial intelligence model 1350.

In some embodiments, the relative priority ranking, which may be used to select a subset of images, may be based on a loss prediction determined by the disclosed system. The loss prediction may be associated with a predicted error for classification associated with an image. As described above, active learning system 1232 may be trained in conjunction with artificial intelligence model 1350 (or primary image analysis model 1234). Accordingly, active learning system 1232 may be a sub-network that is trained in conjunction with artificial intelligence model 1350 and may serve as loss predictor. Active learning system 1232 may be connected to several layers of the original network, which may enable information (features) to flow from different levels of the original network into the active learning system 1232. As a result, active learning system 1232 may be trained to determine a loss prediction for each of the images. A higher loss may represent more informative images. In some embodiments, this loss prediction may be closely related to or associated with a complexity level. For example, more complex images may be associated with a higher loss prediction. Accordingly, in some embodiments, the loss prediction may be determined in lieu of a separate complexity level, or the complexity level may be based on the loss prediction.

In some embodiments, a loss function may be applied to artificial intelligence model 1350 to determine a loss of the model based on labeled images. However, this loss may be biased as many of the input training images may include errors, such as mislabeled objects or inconsistent labeling, as discussed above. Accordingly, the loss for each image predicted by active learning system 1232 may be more accurate as it is not affected by mislabeled images or images with inconsistent labeling. Rather, active learning system 1232 is trained to identify which images result in the greatest benefit in training artificial intelligence model 1350.

According to some embodiments, process 1300 may further include selecting one or more images from images 1220. For example, this may include determining selection 1352, which may include images 1310, 1320, and 1330, as shown in FIG. 13. Selection 1352 may be provided to artificial intelligence model 1350 for training purposes. In some embodiments, this may be a supervised learning process, in which the selected image data may be labeled, either through a manual or automated process. Accordingly, the selected images may be transmitted to an external system or external entity configured to label the selected images. Alternatively or additionally, the images may already be labeled and selection 1352 may include a subset of labeled images used to train artificial intelligence model 1350. In some embodiments, artificial intelligence model 1350 may be an unsupervised or reinforcement learning model and may not require labeling at the outset of the training process. Accordingly, selection 1352 may be input into artificial intelligence model 1350 directly, rather than first submitting the images to be labeled. In other words, once active learning system 1232 is trained to identify images that are most beneficial to artificial intelligence model 1350, active learning system 1232 may be used to select a subset of unlabeled image data, which may be used to train artificial intelligence model 1350 without first labeling the subset of images.

Selection 1352 may be identified in various ways. In some embodiments, this may include comparing one or more indicators, which may include complexity indicators, diversity indicators, or some combination of both, to a predetermined threshold. For example, selection 1352 may represent images within the set of images 1220 in which a complexity score exceeds a predetermined threshold, a diversity score exceeds a predetermined threshold, the complexity and diversity scores each exceed respective thresholds, a combined score based on complexity and diversity exceeds a threshold, or any other suitable metric based on one or more thresholds. In some embodiments, a percentage of images exceeding a predetermined threshold may be selected. In other words, of the images that exceed the various example thresholds above, a certain percentage may be selected for inclusion in selection 1352. This may include the top-ranked percentage of the images exceeding the threshold, a top-ranked number of images exceeding the threshold, a randomized subset of images that exceed the threshold, or the like.

As another example, selection 1352 may represent a predetermined size of a training data set. For example, selection 1352 may be a predetermined number of images (3 images in this example), and the top-ranked images may be selected until this number is reached. Various other criteria may be used as a predetermined selection size, including a storage size of training data (e.g., measured in gigabytes, etc.), a number of discrete objects included in the selection, a number of object types included in the selection, or the like. While various examples are provided above, one skilled in the art would recognize various other criteria for identifying selection 1352 may be used, which may depend on the particular application.

Figure 14:
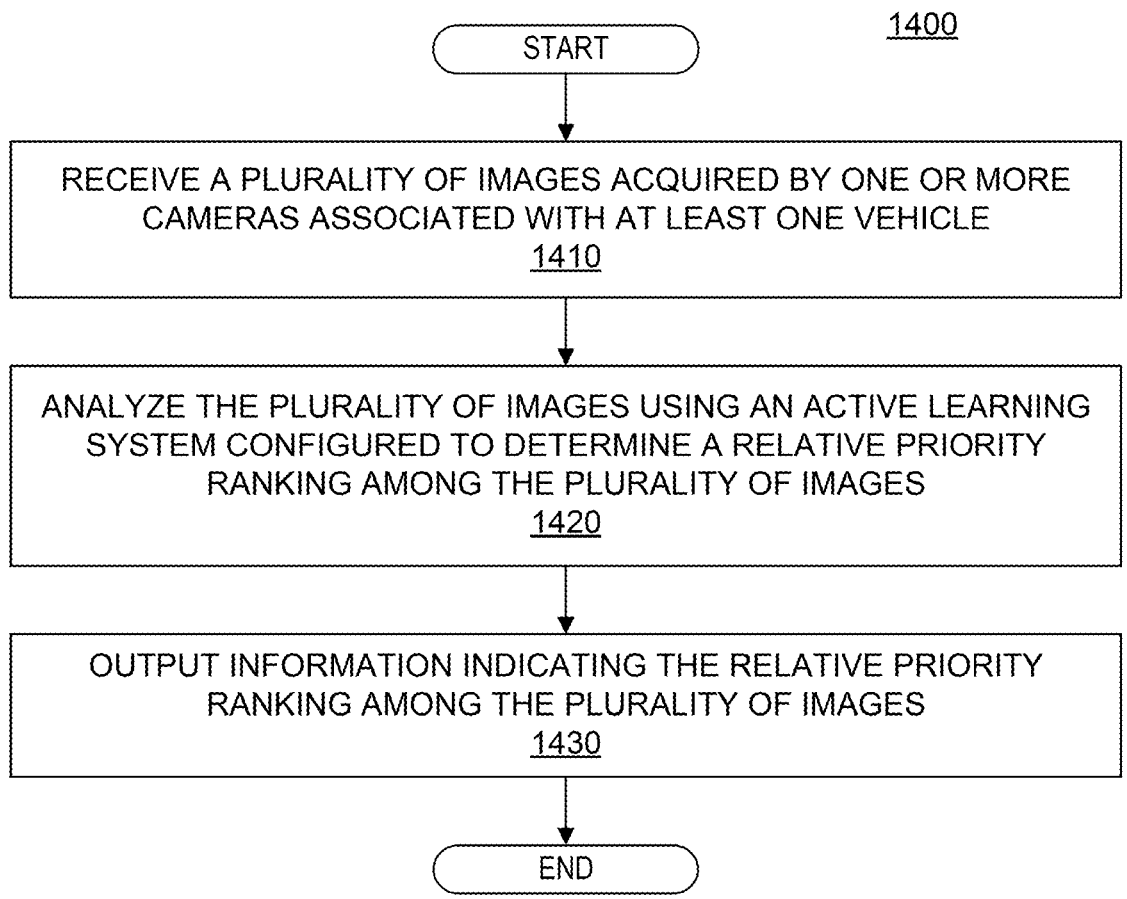
FIG. 14 is a flowchart showing an example process for analyzing a data set including a plurality of images, consistent with the disclosed embodiments.

FIG. 14 is a flowchart showing an example process 1400 for analyzing a data set including a plurality of images, consistent with the disclosed embodiments. Process 1400 may be performed by at least one processing device of a server, such as server 1230, as described above. It is to be understood that throughout the present disclosure, the term "processor" is used as a shorthand for "at least one processor." In other words, a processor may include one or more structures (e.g., circuitry) that perform logic operations whether such structures are collocated, connected, or disbursed. In some embodiments, a non-transitory computer readable medium may contain instructions that when executed by a processor cause the processor to perform process 1400. Further, process 1400 is not necessarily limited to the steps shown in FIG. 14, and any steps or processes of the various embodiments described throughout the present disclosure may also be included in process 1400, including those described above with respect to, for example, FIG. 12 or 13.

In step 1410, process 1400 includes receiving a plurality of images acquired by one or more cameras associated with at least one vehicle. For example, this may include receiving images 1220, which may be captured by camera 1212 of host vehicle 1210, as described above. In some embodiments, the plurality of images may be acquired during a plurality of drives by a plurality of vehicles. This may include a plurality of drives that occurred during a predetermined period of time. As another example, the plurality of images may be acquired from a geographical region. For example, the geographical region may include a common road segment, or any other defined region.

In step 1420, process 1400 includes analyzing the plurality of images using an active learning system configured to determine a relative priority ranking among the plurality of images. As described above, the relative priority ranking may indicate an ordered sequence for the plurality of images. As described above, the active learning system may include a neural network, a machine learning system, or any other form of artificial intelligence model. For example, the active learning system may be trained in conjunction the training of a primary image analysis model, as described above.

In some embodiments, the relative priority ranking among the plurality of images may be determined based on at least one indicator, determined for each of the plurality of images, of a complexity level, a diversity level, or both associated with representations of one or more objects represented in the plurality of images. The one or more objects may include at least one of a vehicle, a pedestrian, a road surface, a road edge, or various other objects that may be encountered within the environment of a host vehicle, as described throughout the present disclosure. In some embodiments, the complexity level may be determined based on analysis of edges of the one or more objects represented in the plurality of images, as described above. For example, the complexity level may be based on the number of discrete objects included in each image. The diversity level may be determined based on analysis of an object type of the one or more objects represented in the plurality of images. For example, the diversity level may be based on the number of different types of objects included in an image, as described above.

In some embodiments, the active learning system may further be configured to determine the relative priority ranking among the plurality of images based on a determined loss prediction. For example, the active learning system may be trained in conjunction with a primary image analysis model to generate the determined loss prediction for each of the plurality of images, as described above. This determined loss prediction may be associated with a predicted error for a classification associated with one or more of the plurality of images. For example, images with a higher predicted error (i.e., more difficult for a primary image analysis model to classify) may be associated with a higher loss, and thus may be more beneficial for the training the primary image analysis model.

In some embodiments, process 1400 may further include selecting a subset of the plurality of images based on the relative priority ranking among the plurality of images. The subset of images may be selected based on various metrics or schemes, as described above. For example, selecting the subset of the plurality of images includes selecting a percentage of the plurality of images having a predetermined complexity level, a predetermined complexity level, or combination thereof. As another example, selecting the subset of the plurality of images includes selecting a predetermined number of the plurality of images having a predetermined complexity level, a predetermined complexity level, or combination thereof. In some embodiments, process 1400 may include causing the selected subset of the plurality of images to be transmitted to an external system or an external entity. For example, the external system or the external entity may be configured to label one or more objects represented in each of the selected subset of the plurality of images. Alternatively or additionally, the external entity may be configured to train an external active learning system using the selected subset of the plurality of images. In some embodiments, the plurality of images may comprise labeled images. Accordingly, process 1400 may include inputting the selected images into a primary image analysis model to train the primary image analysis model. This selected subset of images may allow the primary image analysis model to converge more quickly and may result in improved performance of the model, as described above.

In step 1430, process 1400 includes output information indicating the relative priority ranking among the plurality of images. In some embodiments, the information indicating the relative priority ranking among the plurality of images may include a selected subset of images, as described above. Alternatively or additionally, the information indicating the relative priority ranking among the plurality of images may include an ordered list of at least two of the plurality of images or an ordered ranking associated with at least two of the plurality of images.

Figure 15:
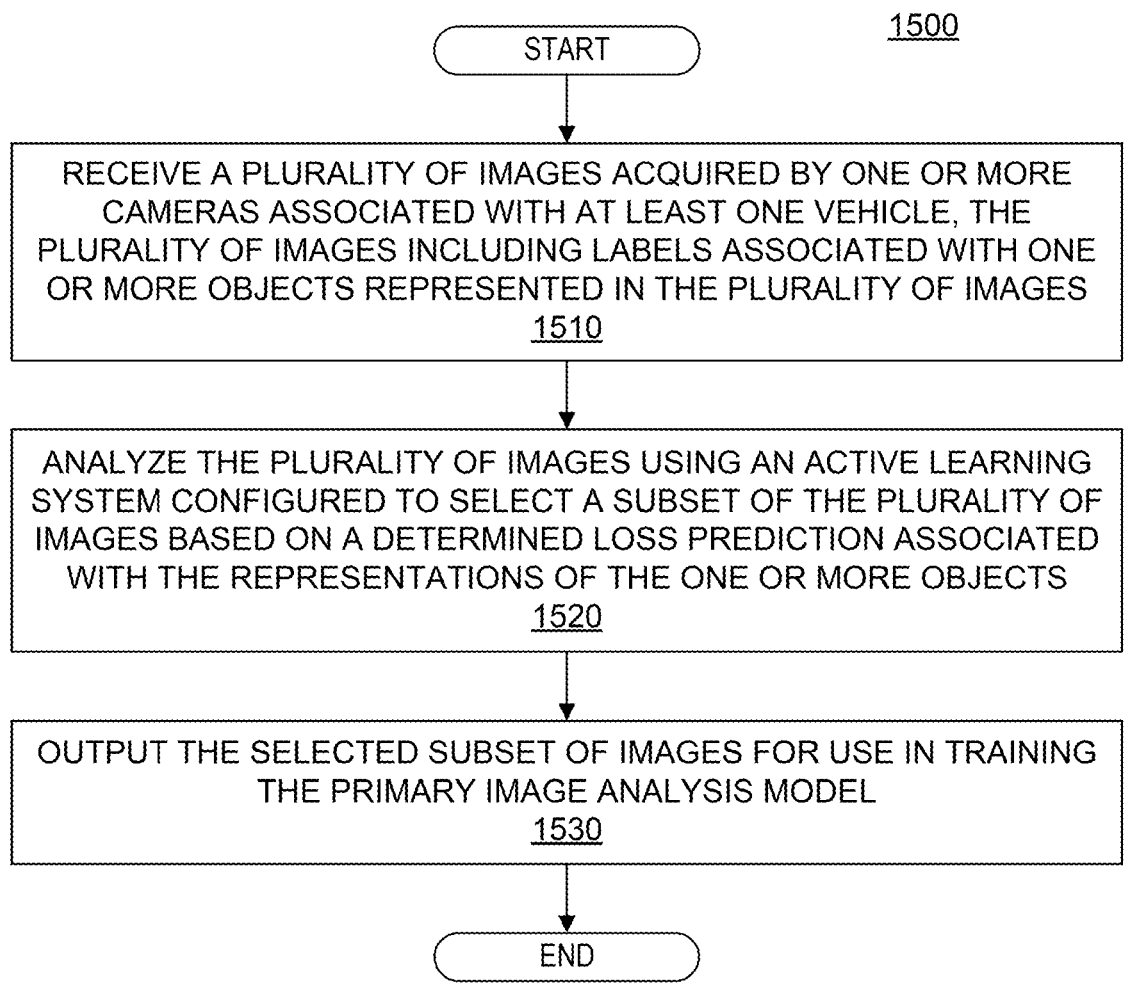
FIG. 15 is a flowchart showing another example process for analyzing a data set including a plurality of images, consistent with the disclosed embodiments.

FIG. 15 is a flowchart showing another example process 1500 for analyzing a data set including a plurality of images, consistent with the disclosed embodiments. In particular, process 1500 may be performed on a plurality of labeled images. Process 1500 may be performed by at least one processing device of a server, such as server 1230, as described above. In some embodiments, a non-transitory computer readable medium may contain instructions that when executed by a processor cause the processor to perform process 1500. Further, process 1500 is not necessarily limited to the steps shown in FIG. 15, and any steps or processes of the various embodiments described throughout the present disclosure may also be included in process 1500, including those described above with respect to, for example, FIG. 12, 13, or 14.

In step 1510, process 1500 includes receiving a plurality of images acquired by one or more cameras associated with at least one vehicle. In some embodiments, the plurality of images may include labels associated with one or more objects represented in the plurality of images. For example, the one or more objects may include at least one of a vehicle, a pedestrian, a road surface, a road edge, or various other objects that may be encountered within the environment of a host vehicle, as described throughout the present disclosure.

In step 1520, process 1500 includes analyzing the plurality of images using an active learning system configured to select a subset of the plurality of images. As described above, the selected subset of the plurality of images may be determined based on a determined loss prediction associated with the representations of the one or more objects. For example, the active learning system may be trained in conjunction with a primary image analysis model to generate the determined loss prediction for each of the plurality of images, as described above. This determined loss prediction may be associated with a predicted error for a classification associated with one or more of the plurality of images. For example, images with a higher predicted error (i.e., more difficult for a primary image analysis model to classify) may be associated with a higher loss, and thus may be more beneficial for the training the primary image analysis model.

In some embodiments, step 1520 may further include determining the selected subset of images based on at least one indicator, determined for each of the plurality of images, of a complexity level and/or a diversity level associated with the representations of one or more objects represented in the plurality of images, as described above. In some embodiments, step 1520 may further include determining the selected subset based on a determined relative priority ranking among the plurality of images, the relative priority ranking indicating an ordered sequence for the plurality of images In step 1530, process 1500 includes outputting the selected subset of images for use in training the primary image analysis model. For example, this selected subset of labeled images may be used to train the primary image analysis model in a more efficient manner and may result in a more accurate and/or robust model, as described herein.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for analyzing a data set including a plurality of images, the system comprising:
at least one processor programmed to:
receive a plurality of images acquired by one or more cameras associated with at least one vehicle;
analyze the plurality of images using an active learning system configured to determine a relative priority ranking among the plurality of images, the active learning system including a trained machine learning model configured to receive the plurality of images as an input and to output, for each of the plurality of images, at least a priority ranking indicator based on a combination of a complexity indicator and a diversity indicator of the image, the relative priority ranking indicating an ordered sequence for the plurality of images; and
select, based on the relative priority ranking among the plurality of images, a subset of the plurality of images for use in training a primary image analysis model, wherein the trained machine learning model is trained based at least in part on feedback from the primary image analysis model during training of the primary image analysis model, and wherein during training of the trained machine learning model and the primary image analysis model, the trained machine learning model converges before the primary image analysis model.

2. The system of claim 1, wherein the relative priority ranking among the plurality of images includes an ordered list of at least two of the plurality of images.

3. The system of claim 1, wherein the relative priority ranking among the plurality of images includes an ordered ranking associated with at least two of the plurality of images.

4. The system of claim 1, wherein selecting the subset of the plurality of images includes selecting a percentage of the plurality of images having a predetermined complexity level.

5. The system of claim 1, wherein selecting the subset of the plurality of images includes selecting a percentage of the plurality of images having a predetermined diversity level.

6. The system of claim 1, wherein selecting the subset of the plurality of images includes selecting a predetermined number of the plurality of images having a predetermined complexity level.

7. The system of claim 1, wherein selecting the subset of the plurality of images includes selecting a predetermined number of the plurality of images having a predetermined diversity level.

8. The system of claim 1, wherein the at least one processor is further programmed to cause the selected subset of the plurality of images to be transmitted to an external system or an external entity.

9. The system of claim 8, wherein the external system or the external entity is configured to label one or more objects represented in each of the selected subset of the plurality of images.

10. The system of claim 8, wherein the external system or the external entity is configured to train an external active learning system using the selected subset of the plurality of images.

11. The system of claim 1, wherein the plurality of images comprise labeled images and the at least one processor is further programmed to input the selected subset of images into the primary image analysis model to train the primary image analysis model.

12. The system of claim 1, wherein the complexity indicator is based on analysis of edges of the one or more objects represented in the plurality of images.

13. The system of claim 1, wherein the diversity indicator is based on analysis of an object type of the one or more objects represented in the plurality of images.

14. The system of claim 1, wherein the active learning system is further configured to determine the relative priority ranking among the plurality of images based on a determined loss prediction.

15. The system of claim 14, wherein the determined loss prediction is associated with a predicted error for a classification associated with one or more of the plurality of images.

16. The system of claim 1, wherein the trained machine learning model includes a neural network.

17. The system of claim 1, wherein the one or more objects include at least one of a vehicle, a pedestrian, a road surface, or a road edge.

18. The system of claim 1, wherein the plurality of images are acquired during a plurality of drives by a plurality of vehicles.

19. The system of claim 18, wherein the plurality of drives occurred during a predetermined period of time.

20. The system of claim 1, wherein the plurality of images are acquired from a geographical region.

21. The system of claim 20, wherein the geographical region includes a common road segment.

22. The system of claim 1, wherein the primary image analysis model is trained to identify objects represented in the subset of the plurality of images.

23. A non-transitory computer readable medium containing instructions that when executed by at least one processor, cause the at least one processor to perform a method for analyzing a data set including a plurality of images, the method comprising:
receiving a plurality of images acquired by one or more cameras associated with at least one vehicle;
analyzing the plurality of images using an active learning system configured to determine a relative priority ranking among the plurality of images, the active learning system including a trained machine learning model configured to receive the plurality of images as an input and to output, for each of the plurality of images, at least a priority ranking indicator based on a combination of a complexity indicator and a diversity indicator of the image, the relative priority ranking indicating an ordered sequence for the plurality of images; and
selecting, based on the relative priority ranking among the plurality of images, a subset of the plurality of images for use in training a primary image analysis model, wherein the trained machine learning model is trained based at least in part on feedback from the primary image analysis model during training of the primary image analysis model, and wherein during training of the trained machine learning model and the primary image analysis model, the trained machine learning model converges before the primary image analysis model.

24. The non-transitory computer readable medium of claim 23, wherein selecting the subset of the plurality of images includes selecting a percentage of the plurality of images having a predetermined complexity level.

25. The non-transitory computer readable medium of claim 23, wherein selecting the subset of the plurality of images includes selecting a percentage of the plurality of images having a predetermined diversity level.

26. A method for analyzing a data set including a plurality of images, the method comprising:
receiving a plurality of images acquired by one or more cameras associated with at least one vehicle;
analyzing the plurality of images using an active learning system configured to determine a relative priority ranking among the plurality of images, the active learning system including a trained machine learning model configured to receive the plurality of images as an input and to output, for each of the plurality of images, at least a priority ranking indicator based on a combination of a complexity indicator and a diversity indicator of the image, the relative priority ranking indicating an ordered sequence for the plurality of images; and
selecting, based on the relative priority ranking among the plurality of images, a subset of the plurality of images for use in training a primary image analysis model, wherein the trained machine learning model is trained based at least in part on feedback from the primary image analysis model during training of the primary image analysis model, and wherein during training of the trained machine learning model and the primary image analysis model, the trained machine learning model converges before the primary image analysis model.

27. The method of claim 26, wherein the plurality of images comprise labeled images and the at least one processor is further programmed to input the selected subset of images into the primary image analysis model to train the primary image analysis model.

28. The method of claim 26, wherein the active learning system is further configured to determine the relative priority ranking among the plurality of images based on a determined loss prediction.

29. A system for analyzing a data set including a plurality of images, the system comprising:
at least one processor programmed to:
receive a plurality of images acquired by one or more cameras associated with at least one vehicle, the plurality of images including labels associated with one or more objects represented in the plurality of images;
analyze the plurality of images using an active learning system configured to select a subset of the plurality of images, the selected subset of the plurality of images being determined based on a determined loss prediction, wherein the active learning system is trained based at least in part on feedback from a primary image analysis model during training of the primary image analysis model to generate the determined loss prediction for each of the plurality of images; and
output the selected subset of images for use in training the primary image analysis model, wherein during training of the active learning system and the primary image analysis model, the active learning system converges before the primary image analysis model.

30. The system of claim 29, wherein the at least one processor is further programmed to determine the selected subset of images based on at least one indicator, determined for each of the plurality of images, of a diversity level associated with the representations of one or more objects represented in the plurality of images.

31. The system of claim 29, wherein the at least one processor is further programmed to determine the selected subset based on a determined relative priority ranking among the plurality of images, the relative priority ranking indicating an ordered sequence for the plurality of images.

32. A non-transitory computer readable medium containing instructions that when executed by at least one processor, cause the at least one processor to perform a method for analyzing a data set including a plurality of images, the method comprising:

receiving a plurality of images acquired by one or more cameras associated with at least one vehicle, the plurality of images including labels associated with one or more objects represented in the plurality of images;

analyzing the plurality of images using an active learning system configured to select a subset of the plurality of images, the selected subset of the plurality of images being determined based on a determined loss prediction, wherein the active learning system is trained based at least in part on feedback from a primary image analysis model during training of the primary image analysis model to generate the determined loss prediction for each of the plurality of images; and outputting the selected subset of images for use in training the primary image analysis model, wherein during training of the active learning system and the primary image analysis model, the active learning system converges before the primary image analysis model.

33. The non-transitory computer readable medium of claim 32, wherein the primary image analysis model is trained to identify objects represented in the subset of the plurality of images.

34. A method for analyzing a data set including a plurality of images, the method comprising:

receiving a plurality of images acquired by one or more cameras associated with at least one vehicle, the plurality of images including labels associated with one or more objects represented in the plurality of images;

analyzing the plurality of images using an active learning system configured to select a subset of the plurality of images, the selected subset of the plurality of images being determined based on a determined loss prediction, wherein the active learning system is trained based at least in part on feedback from a primary image analysis model during training of the primary image analysis model to generate the determined loss prediction for each of the plurality of images; and outputting the selected subset of images for use in training the primary image analysis model, wherein during training of the active learning system and the primary image analysis model, the active learning system converges before the primary image analysis model.

35. The method of claim 34, wherein the active learning system is further configured to determine a relative priority ranking among the plurality of images based on the determined loss prediction.

36. The method of claim 34, wherein the determined loss prediction is associated with a predicted error for a classification associated with one or more of the plurality of images.

* * * * *